US012050739B2

(12) United States Patent
Xi et al.

(10) Patent No.: US 12,050,739 B2
(45) Date of Patent: Jul. 30, 2024

(54) METHOD AND SYSTEM FOR GENERATING NOTE

(71) Applicant: Honor Device Co., Ltd., Shenzhen (CN)

(72) Inventors: Yingjun Xi, Shenzhen (CN); Yanqing Hou, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 17/922,402

(22) PCT Filed: Jan. 14, 2022

(86) PCT No.: PCT/CN2022/072153
§ 371 (c)(1),
(2) Date: Oct. 31, 2022

(87) PCT Pub. No.: WO2022/193814
PCT Pub. Date: Sep. 22, 2022

(65) Prior Publication Data
US 2023/0195244 A1 Jun. 22, 2023

(30) Foreign Application Priority Data

Mar. 15, 2021 (CN) .......................... 202110293428.X
Apr. 2, 2021 (CN) .......................... 202110363733.1

(51) Int. Cl.
*G06F 3/0354* (2013.01)
*G06F 1/16* (2006.01)
(Continued)

(52) U.S. Cl.
CPC ........ *G06F 3/03545* (2013.01); *G06F 1/1607* (2013.01); *G06F 3/021* (2013.01);
(Continued)

(58) Field of Classification Search
CPC ............ G06F 3/03545; G06F 3/03547; G06F 40/166–171; G06F 3/0383; G06F 3/0386;
(Continued)

(56) References Cited

U.S. PATENT DOCUMENTS 9,256,588 B1 * 2/2016 Moscovich ........... G06F 40/171
9,430,141 B1 * 8/2016 Lu ....................... G06F 3/04883
(Continued)

FOREIGN PATENT DOCUMENTS

| CN | 102436395 A | 5/2012 |
|---|---|---|
| CN | 104536688 A | 4/2015 |

(Continued)

*Primary Examiner* — Amy Onyekaba
(74) *Attorney, Agent, or Firm* — Conley Rose, P.C.

(57) ABSTRACT

Embodiments of this application provide a method and a system for generating a note. The method includes detecting, by an electronic device, drawing a plurality of discontinuous underlines by a stylus on a touchscreen of the electronic device; combining, by the electronic device, a content selected by the discontinuous underlines to obtain a to-be-stored content; displaying, by the electronic device, a previous box comprising the to-be-stored content; controlling, by the electronic device, a target device to store the to-be-stored content, where the target device is at least one of the electronic device and the stylus; and outputting, by the target device, the to-be-stored content. In the embodiments of this application, a storage function of the electronic device and/or the stylus is used to output the to-be-stored content required by a user as a separate note, which facilitates convenience for the user to read key notes and improves user experience.

20 Claims, 21 Drawing Sheets

(51) Int. Cl.

| | | |
|---|---|---|
| *G06F 3/02* | (2006.01) | |
| *G06F 3/038* | (2013.01) | |
| *G06F 3/041* | (2006.01) | |
| *G06F 3/044* | (2006.01) | |
| *G06F 3/04842* | (2022.01) | |
| *G06F 3/04883* | (2022.01) | |
| *G06F 40/166* | (2020.01) | |
| *H02J 7/34* | (2006.01) | |
| *H02J 50/10* | (2016.01) | |
| *H02J 50/80* | (2016.01) | |
| *H04W 72/21* | (2023.01) | |
| *H04W 72/23* | (2023.01) | |

(52) U.S. Cl.
CPC ............ *G06F 3/038* (2013.01); *G06F 3/0383* (2013.01); *G06F 3/04162* (2019.05); *G06F 3/0441* (2019.05); *G06F 3/0442* (2019.05); *G06F 3/04842* (2013.01); *G06F 3/04883* (2013.01); *G06F 40/166* (2020.01); *H02J 7/342* (2020.01); *H02J 50/10* (2016.02); *H02J 50/80* (2016.02); *H04W 72/21* (2023.01); *H04W 72/23* (2023.01); *G06F 2203/0384* (2013.01)

(58) Field of Classification Search
CPC .. G06F 3/0441; G06F 3/0442; G06F 3/04842; G06F 3/04883
See application file for complete search history.

(56) References Cited

U.S. PATENT DOCUMENTS

| | | |
|---|---|---|
| 10,534,524 B2 | 1/2020 | Yang et al. |
| 10,702,769 B2 | 7/2020 | Li et al. |
| 2013/0106770 A1 | 5/2013 | Bakken et al. |
| 2013/0191108 A1* | 7/2013 | Anisimovich .......... G06F 40/30 704/4 |
| 2014/0062962 A1 | 3/2014 | Jang et al. |
| 2014/0181740 A1* | 6/2014 | Gachoka ............. G06F 3/04842 715/802 |
| 2014/0189482 A1* | 7/2014 | Hill ........................ G06F 40/18 715/212 |
| 2014/0253470 A1 | 9/2014 | Havilio |
| 2015/0186349 A1 | 7/2015 | Hicks et al. |
| 2016/0034151 A1* | 2/2016 | Yang .................. G06F 3/04842 715/765 |
| 2016/0070688 A1* | 3/2016 | Yao ....................... G06F 40/169 715/232 |
| 2016/0300321 A1* | 10/2016 | Naya ..................... G06F 40/169 |
| 2018/0349692 A1* | 12/2018 | Dixon ................... G06F 3/0412 |
| 2019/0065476 A1* | 2/2019 | Kwon .................... G06V 20/62 |
| 2019/0220507 A1* | 7/2019 | Foss ...................... G06F 40/171 |
| 2021/0141997 A1* | 5/2021 | Pinnamaneni ...... G06F 3/04847 |
| 2022/0027026 A1* | 1/2022 | Ide ....................... G06F 3/04883 |
| 2022/0261439 A1* | 8/2022 | Petty ..................... G06F 16/908 |

FOREIGN PATENT DOCUMENTS

| | | | |
|---|---|---|---|
| CN | 104866306 A | | 8/2015 |
| CN | 105320403 A | | 2/2016 |
| CN | 106445199 A | | 2/2017 |
| CN | 109190101 A | | 1/2019 |
| CN | 110908582 A | * | 3/2020 |
| CN | 110908582 A | | 3/2020 |
| CN | 111459313 A | | 7/2020 |
| CN | 111665984 A | | 9/2020 |
| CN | 111813299 A | | 10/2020 |
| CN | 113157189 A | | 7/2021 |
| CN | 113238703 A | | 8/2021 |

* cited by examiner

METHOD AND SYSTEM FOR GENERATING NOTE

CROSS-REFERENCE TO RELATED APPLICATIONS

This application is a U.S. National Stage of International Application No. PCT/CN2022/072153 filed on Jan. 14, 2022, which claims priority to Chinese Patent Application No. 202110293428.X, filed with the China National Intellectual Property Administration on Mar. 15, 2021, and to Chinese Patent Application No. 202110363733.1, filed with the China National Intellectual Property Administration on Apr. 2, 2021, all of which are incorporated herein in this application by reference in their entireties.

TECHNICAL FIELD

Embodiments of this application relate to the field of communications technologies, and in particular, to a method and a system for generating a note.

BACKGROUND

With the development of touch technologies, more electronic devices implement human-computer interaction in a touch manner. For example, a user may provide input to an electronic device by operating a touchscreen of the electronic device using a stylus, and the electronic device performs a corresponding operation based on the user's input.

Currently, a user can use a stylus to write on a touchscreen, and an electronic device generates content based on a movement track of the stylus on the touchscreen and displays the content written by the user on the touchscreen. In this way, the user can take a note in a reading page displayed on the touchscreen.

However, when the reading page has much original text content or much context written by the user, this makes notes unfocused and causes trouble for the user to read key notes next time.

SUMMARY

Embodiments of this application provide a method and a system for generating a note, which can generate separate notes for key content and improve user experience.

According to a first aspect, an embodiment of this application provides a method for generating a note. The method includes: selecting, by a stylus, to-be-stored content on a touchscreen of an electronic device; and controlling, by the electronic device in response to the to-be-stored content selected by the stylus on the touchscreen of the electronic device, a target device to store the to-be-stored content, where the target device is the electronic device and/or the stylus. The target device may output the to-be-stored content. In a possible implementation, the to-be-stored content is at least one of the following: a text, an image, an audio file, a video file, or a contact. This embodiment of this application does not specifically limit the to-be-stored content.

The electronic device and/or the stylus have a storage function. In this embodiment of this application, the storage function of the electronic device and/or the stylus is used to output the to-be-stored content required by a user as a separate note, which facilitates convenience for the user to read key notes and can improve user experience.

In an embodiment, when detecting a selection indication from the stylus, the electronic device may detect the to-be-stored content selected by the stylus on the touchscreen of the electronic device, which can ensure accuracy of the to-be-stored content detected by the electronic device. In a possible implementation, the stylus is provided with a selection key, the stylus sends the selection indication to the electronic device in response to detecting an operation of the user on the selection key. Alternatively, in a possible implementation, the stylus can perform a first preset action on the touchscreen of the electronic device, the electronic device determines, in response to detecting that the stylus performs the first preset action on the touchscreen, that the selection indication from the stylus has been detected. In an embodiment, the first preset action is at least one of the following: double tap, touch and hold, or write a preset track. Certainly, the first preset action may alternatively be another action, which is not limited in this embodiment of this application.

In a possible implementation, to help the electronic device to distinguish between a track left by the stylus when writing a note and a preset track written by the stylus, a preset area for performing detection for the first preset action may be preset on the electronic device. The electronic device determines, in response to detecting that the stylus performs the first preset action in the preset area of the touchscreen, that a selection indication from the stylus has been detected. This implementation can ensure accuracy of the detected first preset action, avoid false detection, and improve user experience.

The following describes the method for generating a note in this embodiment of this application by using the stylus, or the electronic device, or the "electronic device and stylus" as the target device.

Example 1: When the target device is the stylus, the electronic device can send the to-be-stored content to the stylus in response to the to-be-stored content selected by the stylus on the touchscreen of the electronic device, and the stylus stores the to-be-stored content.

The outputting, by the stylus, the to-be-stored content may include: sending, by the stylus, the to-be-stored content to the electronic device (or a third-party device), so that the electronic device (or the third-party device) outputs the to-be-stored content. The following uses "the sending, by the stylus, the to-be-stored content to the electronic device" as an example for description.

In this implementation, before the stylus outputs the to-be-stored content, the stylus may output an output indication. In other words, when the electronic device detects the output indication, the electronic device may receive the to-be-stored content from the stylus. The stylus may be provided with an output key, and the stylus may send the to-be-stored content to the electronic device in response to detecting a selection operation of the user on the output key. Alternatively, the electronic device may detect an action of the stylus on the touchscreen of the electronic device, and in response to detecting a second preset action of the stylus, determine that an output indication from the stylus has been detected. In an embodiment, the second preset action is at least one of the following: double tap, touch and hold, or write a preset track. The first preset action and the second preset action may be the same or different.

Example 2: When the target device is the electronic device, the electronic device may store the to-be-stored content in response to the to-be-stored content selected by the stylus on the touchscreen of the electronic device. The electronic device may output the to-be-stored content, or send the to-be-stored content to a third-party device so that the third-party device outputs the to-be-stored content. The following uses that the electronic device outputs the to-be-stored content as an example for description.

In a possible implementation, when detecting the output indication from the stylus, the electronic device may output the to-be-stored content. For that the electronic device detects the output indication from the stylus, reference may be made to the relevant description in "Example 1".

Example 3: When the target device is the stylus and the electronic device, in response to the to-be-stored content selected by the stylus on the touchscreen of the electronic device, the electronic device may store the to-be-stored content, and send the to-be-stored content to the stylus. It should be understood that the target device outputs the to-be-stored content, which may be: The electronic device may output the to-be-stored content, or a predetermined device outputs the to-be-stored content (from the stylus or the electronic device).

In a possible implementation, the to-be-stored content stored by the stylus may be different from the to-be-stored content stored by the electronic device, which means that the stylus has selected the to-be-stored content twice on the electronic device, with the to-be-stored content selected one time stored in the electronic device and the to-be-stored content selected the other time stored in the stylus. In such a scenario, when the target device outputs the to-be-stored content, the stylus may send the to-be-stored content stored in the stylus to the electronic device, so that the electronic device outputs the to-be-stored content stored in the electronic device and the to-be-stored content from the stylus. Alternatively, when the target device outputs the to-be-stored content, both the stylus and the electronic device may send the to-be-stored content to the predetermined device, so that the predetermined device outputs the to-be-stored content from the electronic device and the to-be-stored content from the stylus.

In a possible implementation, regardless of whether the electronic device or the third-party device outputs the to-be-stored content, the electronic device and the third-party device may output the to-be-stored content in a preset application program.

In a possible implementation, in the case of detecting, by an electronic device, to-be-stored content selected by a stylus on a touchscreen of the electronic device, the method further includes: displaying, by the electronic device, the to-be-stored content in a preview state. The displaying, by the electronic device, the to-be-stored content in a preview state includes: displaying, by the electronic device, a preview box, where the preview box includes the to-be-stored content.

In this possible implementation, the electronic device may display the to-be-stored content in the preview state, so that the selected to-be-stored content can be viewed in real time.

In a possible implementation, the preview box further includes a confirm control, and before the controlling, by the electronic device, a target device to store the to-be-stored content, the method further includes: detecting, by the electronic device, that the stylus has selected the confirm control. In this implementation, the user may confirm the selected to-be-stored content, which can ensure accuracy of the to-be-stored content and improve user experience.

In a possible implementation, in the case of detecting, by an electronic device, to-be-stored content selected by a stylus on a touchscreen of the electronic device, the method further includes: displaying, by the electronic device, an identifier of a device that stores the to-be-stored content, where the device includes the stylus and the electronic device. In other words, the user can choose the device that stores the to-be-stored content, which improves flexibility. In this possible implementation, before the controlling, by the electronic device, a target device to store the to-be-stored content, the method further includes: determining, by the electronic device, the target device based on a selection operation performed by the electronic device on the identifier of the device.

In a possible implementation, the to-be-stored content is a text and/or an image, the to-be-stored content is a to-be-stored image, and before the controlling, by the electronic device, a target device to store the to-be-stored content, the method includes: taking, by the electronic device, a screenshot of the to-be-stored content to obtain the to-be-stored image.

In a possible implementation, multiple pieces of to-be-stored content are present, and the controlling, by the electronic device, a target device to store the to-be-stored content includes: controlling, by the electronic device, the target device to store the to-be-stored content and identifiers of the to-be-stored content in a correspondence manner.

Correspondingly, before the sending, by the target device, the to-be-stored content to a predetermined device, the method further includes: sending, by the target device, identifiers of all to-be-stored content to the predetermined device; outputting, by the predetermined device, the identifiers of all to-be-stored content; and in response to an operation performed by the stylus on a target identifier in the identifiers of all to-be-stored content, sending, by the predetermined device, the target identifier to the target device. The sending, by the target device, the to-be-stored content to a predetermined device includes: sending, by the target device, target to-be-stored content corresponding to the target identifier to the predetermined device. The outputting, by the predetermined device, the to-be-stored content includes: outputting, by the predetermined device, the target to-be-stored content.

In this possible implementation, when storing the to-be-stored content, the electronic device and/or the stylus can obtain the identifier of the to-be-stored content, so that the target device stores the to-be-stored content and the identifier of the to-be-stored content in a correspondence manner. In a possible implementation, the identifier of the to-be-stored content may be obtained by the electronic device or obtained by the stylus, which is not limited in this embodiment of this application. Before the electronic device and/or the stylus outputs the to-be-stored content, the electronic device or the predetermined device may be caused to display an identifier of each piece of to-be-stored content for selecting to-be-stored content that needs to be output, and then output the to-be-stored content selected by the user.

In this embodiment of this application, the stylus may classify to-be-stored content with a same identifier based on the identifier of the to-be-stored content, and during note generation, the electronic device may generate a note based on a class of the to-be-stored content, which facilitates convenience for the user to read notes of different classes, improving user experience.

According to a second aspect, an embodiment of this application provides a method for generating a note, applied to a stylus. The method includes: selecting to-be-stored content on a touchscreen of the electronic device; and outputting the to-be-stored content.

In a possible implementation, before the selecting to-be-stored content on a touchscreen of the electronic device, the method further includes: outputting, by the stylus, a selection indication.

In a possible implementation, the stylus is provided with a selection key, the outputting, by the stylus, a selection indication includes: sending, by the stylus, the selection indication to the electronic device in response to detecting an operation of a user on the selection key.

In a possible implementation, the outputting, by the stylus, a selection indication includes: performing, by the stylus, a first preset action on the touchscreen.

In a possible implementation, the outputting, by the stylus, a selection indication includes: performing, by the stylus, the first preset action in a preset area of the touchscreen.

In a possible implementation, before the outputting the to-be-stored content, the method further includes: receiving the to-be-stored content from the electronic device; and storing, by the stylus, the to-be-stored content.

In a possible implementation, the outputting, by the stylus, the to-be-stored content includes: sending, by the stylus, the to-be-stored content to a predetermined device; and outputting, by the predetermined device, the to-be-stored content, where the predetermined device is the electronic device or a third-party device.

In a possible implementation, before the sending, by the stylus, the to-be-stored content to a predetermined device, the method further includes: outputting, by the stylus, an output indication.

In a possible implementation, the to-be-stored content is a to-be-stored image.

In a possible implementation, the receiving the to-be-stored content from the electronic device includes: receiving the to-be-stored content and an identifier of the to-be-stored content, and further storing, by the stylus, the to-be-stored content and the identifier of the to-be-stored content in a correspondence manner.

In a possible implementation, multiple pieces of to-be-stored content are present, and before the sending, by the stylus, the to-be-stored content to a predetermined device, the method further includes: sending, by the stylus, identifiers of all to-be-stored content to the predetermined device; receiving, by the stylus, a target identifier from the predetermined device; and sending, by the stylus, target to-be-stored content corresponding to the target identifier to the predetermined device, so that the predetermined device outputs the target to-be-stored content.

In a possible implementation, the first preset action is at least one of the following: double tap, touch and hold, or write a preset track.

In a possible implementation, the to-be-stored content is at least one of the following: a text, an image, an audio file, a video file, or a contact.

According to a third aspect, an embodiment of this application provides a method for generating a note, applied to an electronic device. The method includes: detecting, by the electronic device, to-be-stored content selected by a stylus on a touchscreen of the electronic device: controlling, by the electronic device, a target device to store the to-be-stored content, where the target device is the electronic device and/or the stylus; and when the target device is the electronic device, outputting, by the electronic device, the to-be-stored content.

In a possible implementation, before the detecting, by the electronic device, to-be-stored content selected by a stylus on a touchscreen of the electronic device, the method further includes: detecting, by the electronic device, a selection indication from the stylus.

In a possible implementation, the stylus is provided with a selection key, and the detecting, by the electronic device, a selection indication from the stylus includes: sending, by the stylus, the selection indication to the electronic device in response to detecting an operation of a user on the selection key.

In a possible implementation, the detecting, by the electronic device, a selection indication from the stylus includes: determining, by the electronic device in response to detecting that the stylus performs a first preset action on the touchscreen, that a selection indication from the stylus has been detected.

In a possible implementation, the determining, by the electronic device in response to detecting that the stylus performs a first preset action on the touchscreen, that a selection indication from the stylus has been detected includes: determining, by the electronic device in response to detecting that the stylus performs a first preset action in a preset area of the touchscreen, that a selection indication from the stylus has been detected.

In a possible implementation, when the target device is the stylus, the controlling, by the electronic device, a target device to store the to-be-stored content includes: sending, by the electronic device, the to-be-stored content to the stylus.

In a possible implementation, the outputting, by the target device, the to-be-stored content includes: outputting, by the electronic device, the to-be-stored content, or sending, by the electronic device, the to-be-stored content to a predetermined device, so that the predetermined device outputs the to-be-stored content.

In a possible implementation, the outputting, by the electronic device, the to-be-stored content may be: outputting, by the electronic device, the to-be-stored content in a preset application program.

In a possible implementation, before the sending, by the electronic device, the to-be-stored content to a predetermined device, the method further includes: detecting, by the electronic device, a selection indication from the stylus.

In a possible implementation, in the case of detecting, by an electronic device, to-be-stored content selected by a stylus on a touchscreen of the electronic device, the method further includes: displaying, by the electronic device, the to-be-stored content in a preview state.

In a possible implementation, the displaying, by the electronic device, the to-be-stored content in a preview state includes: displaying, by the electronic device, a preview box, where the preview box includes the to-be-stored content.

In a possible implementation, the preview box further includes a confirm control, and before the controlling, by the electronic device, a target device to store the to-be-stored content, the method further includes: detecting, by the electronic device, that the stylus has selected the confirm control.

In a possible implementation, in the case of detecting, by an electronic device, to-be-stored content selected by a stylus on a touchscreen of the electronic device, the method further includes: displaying, by the electronic device, an identifier of a device that stores the to-be-stored content, where the device includes the stylus and the electronic device.

In a possible implementation, before the controlling, by the electronic device, a target device to store the to-be-stored content, the method further includes: determining, by the electronic device, the target device based on a selection operation performed by the electronic device on the identifier of the device.

In a possible implementation, the to-be-stored content is a text and/or an image, the to-be-stored content is a to-bestored image, and before the controlling, by the electronic device, a target device to store the to-be-stored content, the method includes: taking, by the electronic device, a screenshot of the to-be-stored content to obtain the to-be-stored image.

In a possible implementation, the controlling, by the electronic device, a target device to store the to-be-stored content includes: controlling, by the electronic device, the target device to store the to-be-stored content and an identifier of the to-be-stored content in a correspondence manner.

In a possible implementation, multiple pieces of to-be-stored content are present, and before the sending, by the electronic device, the to-be-stored content to a predetermined device, the method further includes: sending, by the electronic device, identifiers of all to-be-stored content to the predetermined device, so that the predetermined device outputs the identifiers of all to-be-stored content. The electronic device receives a target identifier from the predetermined device, and the electronic device sends target to-be-stored content corresponding to the target identifier to the predetermined device, so that the predetermined device outputs the target to-be-stored content.

In a possible implementation, the first preset action is at least one of the following: double tap, touch and hold, or write a preset track.

In a possible implementation, the to-be-stored content is at least one of the following: a text, an image, an audio file, a video file, or a contact.

According to a fourth aspect, an embodiment of this application provides a stylus, including a processor and a memory, where the memory stores computer executable instructions; and the processor executes the computer executable instructions stored in the memory, so that the processor executes the method according to the second aspect.

According to a fifth aspect, an embodiment of this application provides an electronic device, including a processor and a memory, where the memory stores computer executable instructions: and the processor executes the computer executable instructions stored in the memory, so that the processor executes the method according to the third aspect.

According to a sixth aspect, an embodiment of this application provides a predetermined device, including a processor and a memory, where the memory stores computer executable instructions: and the processor executes the computer executable instructions stored in the memory, so that the processor executes the action executed by the predetermined device according to the first aspect.

According to a seventh aspect, an embodiment of this application provides a system for generating a note, including the stylus according to the fourth aspect and the electronic device according to the fifth aspect.

According to an eighth aspect, an embodiment of this application provides a system for generating a note, including the stylus according to the fourth aspect, the electronic device according to the fifth aspect, and the predetermined device according to the sixth aspect.

According to a ninth aspect, an embodiment of this application provides a computer program product including an instruction, where when the computer program product is run on a computer, the computer is enabled to execute the method according to the second and third aspects.

According to a tenth aspect, an embodiment of this application provides a computer-readable storage medium, where the computer-readable storage medium stores an instruction, and when the instruction runs on a computer, the computer is enabled to execute the methods according to the second and third aspects.

For beneficial effects of the possible implementations of the second aspect to the tenth aspect, refer to the beneficial effects brought by the first aspect and the possible implementations of the first aspect. Details are not described herein again.

The embodiments of this application provide a method and a system for generating a note. The method includes: detecting, by an electronic device, to-be-stored content selected by a stylus on a touchscreen of the electronic device; controlling, by the electronic device, a target device to store the to-be-stored content, where the target device is the electronic device and/or the stylus; and outputting, by the target device, the to-be-stored content. In the embodiments of this application, a storage function of the electronic device and/or the stylus is used to output the to-be-stored content required by a user as a separate note, which facilitates convenience for the user to read key notes and improves user experience.

DETAILED DESCRIPTION OF EMBODIMENTS

Figure 1:
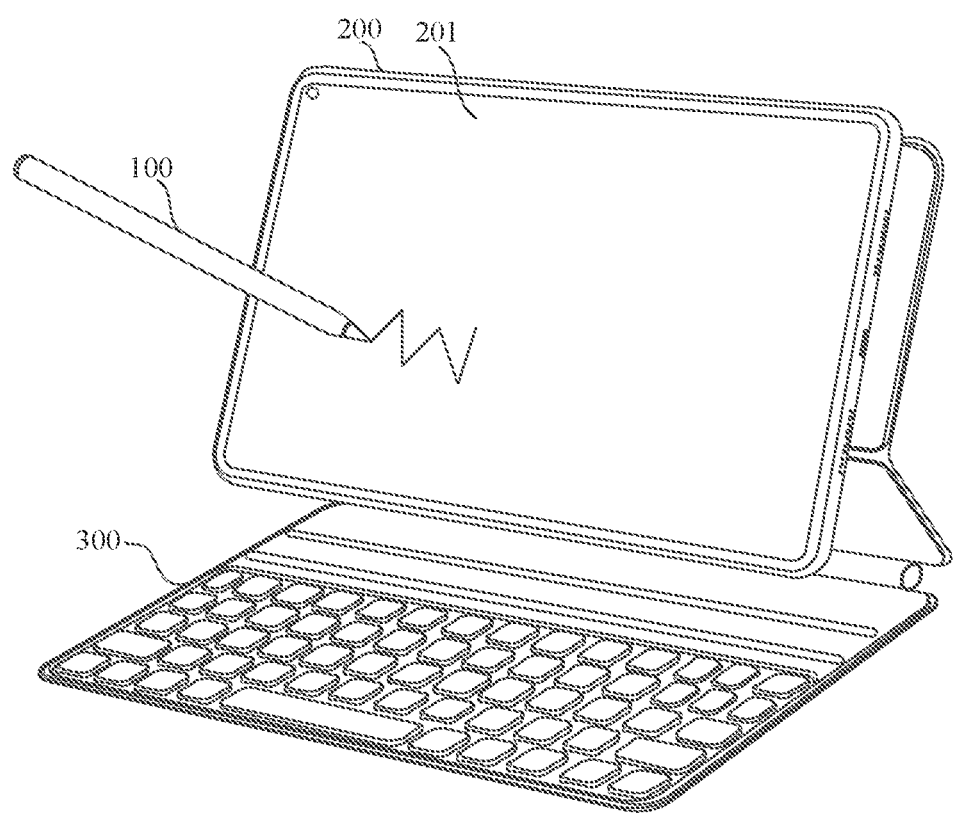
FIG. 1 is a schematic diagram of a scenario according to an embodiment of this application.

FIG. 1 is a schematic diagram of a scenario to which an embodiment of this application is applicable. Referring to FIG. 1, the scenario includes a stylus (stylus) 100, an electronic device 200, and a wireless keyboard 300. In FIG. 1, a tablet (tablet) is used as an example of the electronic device 200 for description. The stylus 100 and the wireless keyboard 300 may provide input to the electronic device 200, and the electronic device 200 performs, based on the input of the stylus 100 or the wireless keyboard 300, an operation in response to the input. A touch area may be set on the wireless keyboard 300, the stylus 100 may operate in the touch area of the wireless keyboard 300 to provide input to the wireless keyboard 300, and the wireless keyboard 300 may perform, based on the input of the stylus 100, an operation in response to the input. In an embodiment, the stylus 100 and the electronic device 200, the stylus 100 and the wireless keyboard 300, and the electronic device 200 and the wireless keyboard 300 may be interconnected through a communications network to implement wireless signal interaction. The communications network may be, but is not limited to, a Wi-Fi hotspot network, a Wi-Fi peer-to-peer (peer-to-peer, P2P) network, a bluetooth network, a zigbee network or a near field communication (near field communication. NFC) network, and other near field communications networks.

The stylus 100 may be, but is not limited to, an inductive stylus and a capacitive stylus. The electronic device 200 has a touchscreen 201. When the stylus 100 is an inductive stylus, an electromagnetic induction board needs to be integrated on the touchscreen 201 of the electronic device 200 that interacts with the stylus 100. Coils are distributed on the electromagnetic induction board, and coils are also integrated in the inductive stylus. Based on the principle of electromagnetic induction, within a range of a magnetic field generated by the electromagnetic induction board, the inductive stylus can accumulate and store electrical energy with movement of the inductive stylus. The inductive stylus may transmit the accumulated electric energy to the electromagnetic induction board via the coils in the inductive stylus through free oscillation. The electromagnetic induction board may scan the coils on the electromagnetic induction board based on the electric energy from the inductive stylus to calculate a position of the inductive stylus on the touchscreen 201. The touchscreen 201 in the electronic device 200 may also be referred to as a touch panel 201, and the stylus 100 may also be referred to as a stylus pen.

The capacitive stylus may include a passive capacitive stylus and an active capacitive stylus. The passive capacitive stylus may be called a passive capacitive stylus, and the active capacitive stylus may be called an active capacitive stylus.

One or more electrodes may be set in the active capacitive stylus (for example, in the tip of the stylus), and the active capacitive stylus may transmit a signal through the electrode (s). When the stylus 100 is an active capacitive stylus, an electrode array needs to be integrated on the touchscreen 201 of the electronic device 200 that interacts with the stylus 100. In an embodiment, the electrode array may be a capacitive electrode array. The electronic device 200 may receive a signal from the active capacitive stylus through the electrode array; and when receiving the signal, the electronic device 200 further recognizes a position of the active capacitive stylus on the touchscreen and a tilt angle of the active capacitive stylus based on changes of a capacitance value on the touchscreen 201.

Figure 2A:
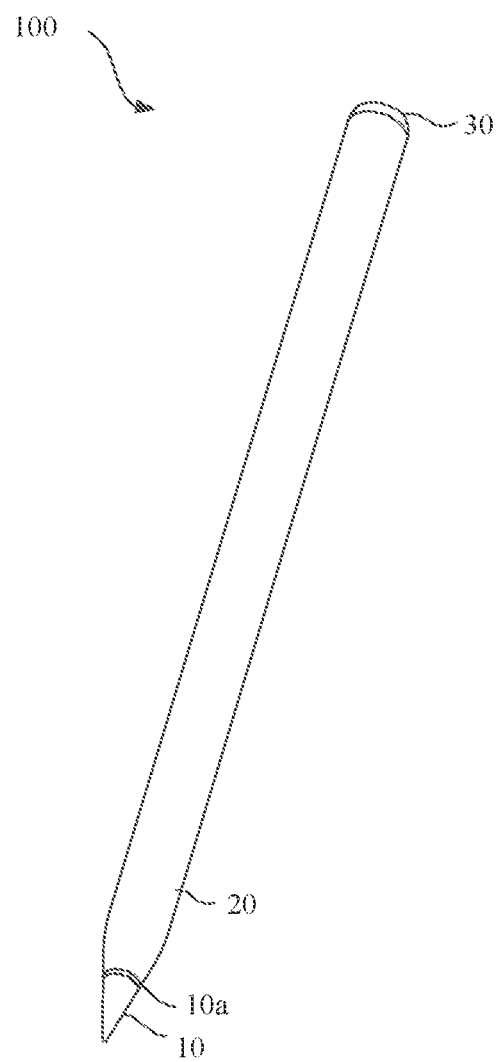
FIG. 2A is a schematic structural diagram of a stylus according to an embodiment of this application.

FIG. 2A is a schematic structural diagram of a stylus according to an embodiment of this application. Referring to FIG. 2A, the stylus 100 may include a tip 10, a barrel 20, and a back cover 30. The barrel 20 is hollowed inside, the tip 10 and the back cover 30 are located at two ends of the barrel 20, respectively, and the back cover 30 and the barrel 20 may be plugged or buckled. For a matching relationship between the tip 10 and the barrel 20, refer to the descriptions in FIG. 2B.

Figure 2B:
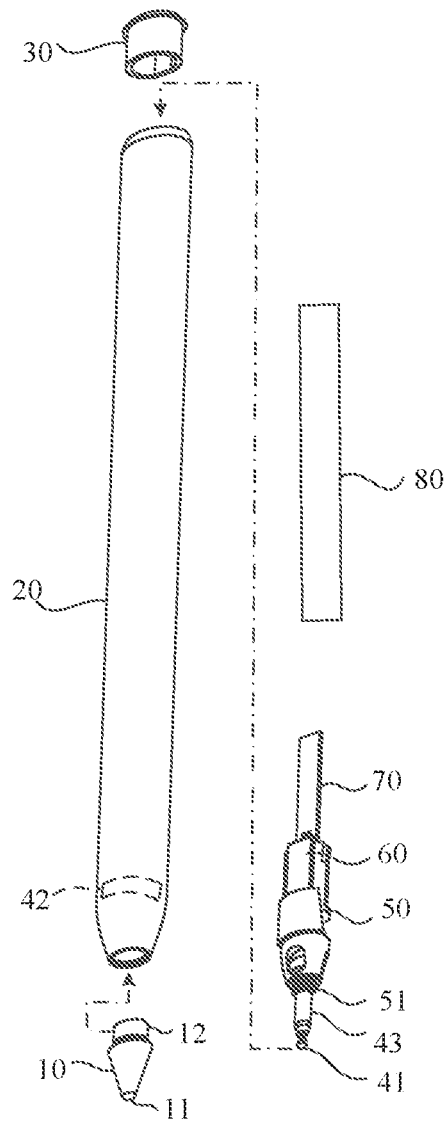
FIG. 2B is a schematic diagram of a partially disassembled structure of a stylus according to an embodiment of this application.

FIG. 2B is a schematic diagram of a partially disassembled structure of a stylus according to an embodiment of this application. Referring to FIG. 2B, the stylus 100 further includes a mainshaft assembly 50, the mainshaft assembly 50 is located in the barrel 20, and the mainshaft assembly 50 is slidably disposed in the barrel 20. The mainshaft assembly 50 has an external thread 51, and the tip 10 includes a writing end 11 and a connecting end 12, where the connecting end 12 of the tip 10 has an internal thread (not shown) matching the external thread 51.

When the mainshaft assembly 50 is assembled into the barrel 20, the connecting end 12 of the tip 10 extends into the barrel 20 and is threadedly connected to the external thread 51 of the mainshaft assembly 50. In some other examples, the connecting end 12 of the tip 10 may alternatively be detachably connected to the mainshaft assembly 50 through buckling or the like. The connecting end 12 of the tip 10 is detachably connected to the mainshaft assembly 50, so as to replace the tip 10.

For detection of a pressure on the writing end 11 of the tip 10, as shown in FIG. 2A, there is a gap 10a between the tip 10 and the barrel 20, which can ensure that when the writing end 11 of the tip 10 is subjected to an external force, the tip 10 may move toward the barrel 20, and the movement of the tip 10 drives the mainshaft assembly 50 to move within the barrel 20. For detection of an external force, as shown in FIG. 2B, the mainshaft assembly 50 is provided with a pressure sensitive assembly 60, part of the pressure sensitive assembly 60 is fixedly connected to a fixed structure in the barrel 20, and part of the pressure sensitive assembly 60 is fixedly connected to the mainshaft assembly 50. In this way, when the mainshaft assembly 50 moves with the tip 10, because part of the pressure sensitive assembly 60 is fixedly connected to the fixed structure in the barrel 20, the movement of the mainshaft assembly 50 causes the pressure sensitive assembly 60 to deform, and the deformation of the pressure sensitive assembly 60 is transferred to a circuit board 70 (for example, the pressure sensitive assembly 60 and the circuit board 70 may be electrically connected through a wire or a flexible circuit board), the circuit board 70 detects the pressure on the writing end 11 of the tip 10 based on the deformation of the pressure sensitive assembly 60, to control line thickness of the writing end 11 based on the pressure on the writing end 11 of the tip 10.

It should be noted that the pressure detection of the tip 10 includes but is not limited to the foregoing method. For example, a pressure sensor may be provided in the writing end 11 of the tip 10, and the pressure on the tip 10 may be detected by the pressure sensor.

In this embodiment, as shown in FIG. 2B, the stylus 100 further includes a plurality of electrodes, and the plurality of electrodes may be, for example, a first emission electrode 41, a ground electrode 43, and a second emission electrode 42. The first emission electrode 41, the ground electrode 43, and the second emission electrode 42 are all electrically connected to the circuit board 70. The first emission electrode 41 may be located within the tip 10 and close to the writing end 11, and the circuit board 70 may be configured as a control board that can separately provide a signal to the first emission electrode 41 and the second emission electrode 42. The first emission electrode 41 is configured o emit a first signal, and when the first emission electrode 41 is close to the touchscreen 201 of the electronic device 200, a coupling capacitor may be formed between the first emission electrode 41 and the touchscreen 201 of the electronic device 200, so that the electronic device 200 can receive the first signal. The second emission electrode 42 is configured to emit a second signal, and the electronic device 200 may determine an angle of inclination of the stylus 100 based on the received second signal. In this embodiment of this application, the second emission electrode 42 may be located on an inner wall of the barrel 20. In an example, the second emission electrode 42 may alternatively be located on the mainshaft assembly 50.

The ground electrode 43 may be located between the first emission electrode 41 and the second emission electrode 42, or the ground electrode 43 may be located around an outer periphery of the first emission electrode 41 and the second emission electrode 42, and the ground electrode 43 is configured to reduce coupling between the first emission electrode 41 and the second emission electrode 42.

When the electronic device 200 receives the first signal from the stylus 100, a capacitance value at a corresponding position of the touchscreen 201 changes. Accordingly, the electronic device 200 may determine the position of the stylus 100 (or the tip of the stylus 100) on the touchscreen 201 based on the change of the capacitance value on the touchscreen 201. In addition, the electronic device 200 may obtain the angle of inclination of the stylus 100 by using a double-tip projection method in an inclination angle detection algorithm. Positions of the first emission electrode 41 and the second emission electrode 42 in the stylus 100 are different. Therefore, when the electronic device 200 receives the first signal and the second signal from the stylus 100, capacitance values at the two positions on the touchscreen 201 change. The electronic device 200 may obtain the angle of inclination of the stylus 100 based on a distance between the first emission electrode 41 and the second emission electrode 42 and a distance between the two positions on the touchscreen 201 at which the capacitance values change. For more details about how to obtain the angle of inclination of the stylus 100, reference may be made to relevant descriptions of a dual-tip projection method in the prior art.

In this embodiment of this application, as shown in FIG. 2B, the stylus 100 further includes a battery assembly 80, where the battery assembly 80 is configured to provide power to the circuit board 70. The battery assembly 80 may include a lithium-ion battery, or the battery assembly 80 may include a nickel-chromium battery, an alkaline battery, a nickel-metal hydride battery, or the like. In an embodiment, the battery included in the battery assembly 80 may be a rechargeable battery or a disposable battery. When the battery included in the battery assembly 80 is a rechargeable battery, the stylus 100 supports wireless charging for the battery in the battery assembly 80.

Figure 3:
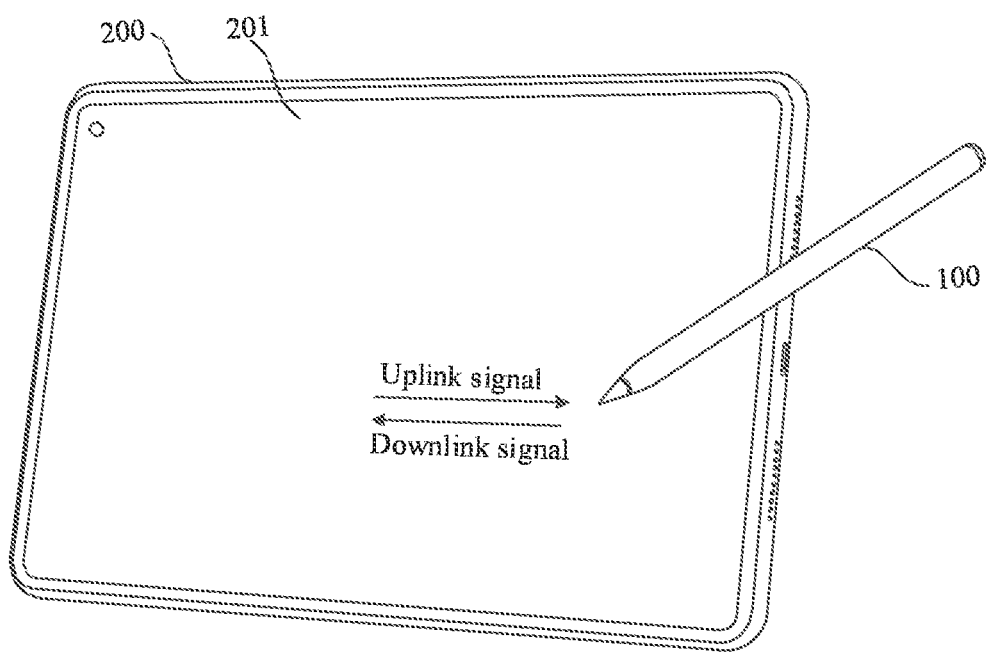
FIG. 3 is a schematic diagram of interaction between a stylus and an electronic device according to an embodiment of this application.

When the stylus 100 is an active capacitive stylus, referring to FIG. 3, after the electronic device 200 and the stylus 100 are wirelessly connected, the electronic device 200 may send an uplink signal to the stylus 100 through the electrode array integrated on the touchscreen 201. The stylus 100 may receive the uplink signal through a receiving electrode, and the stylus 100 may transmit a downlink signal through an emission electrode (for example, the first emission electrode 41 and the second emission electrode 42). The downlink signal includes the foregoing first signal and second signal. When the tip 10 of the stylus 100 contacts the touchscreen 201, a capacitance value at a corresponding position of the touchscreen 201 changes, and the electronic device 200 may determine a position of the tip 10 of the stylus 100 on the touchscreen 201 based on the capacitance value on the touchscreen 201. In an embodiment, the uplink signal and the downlink signal may be square wave signals.

Figure 4:
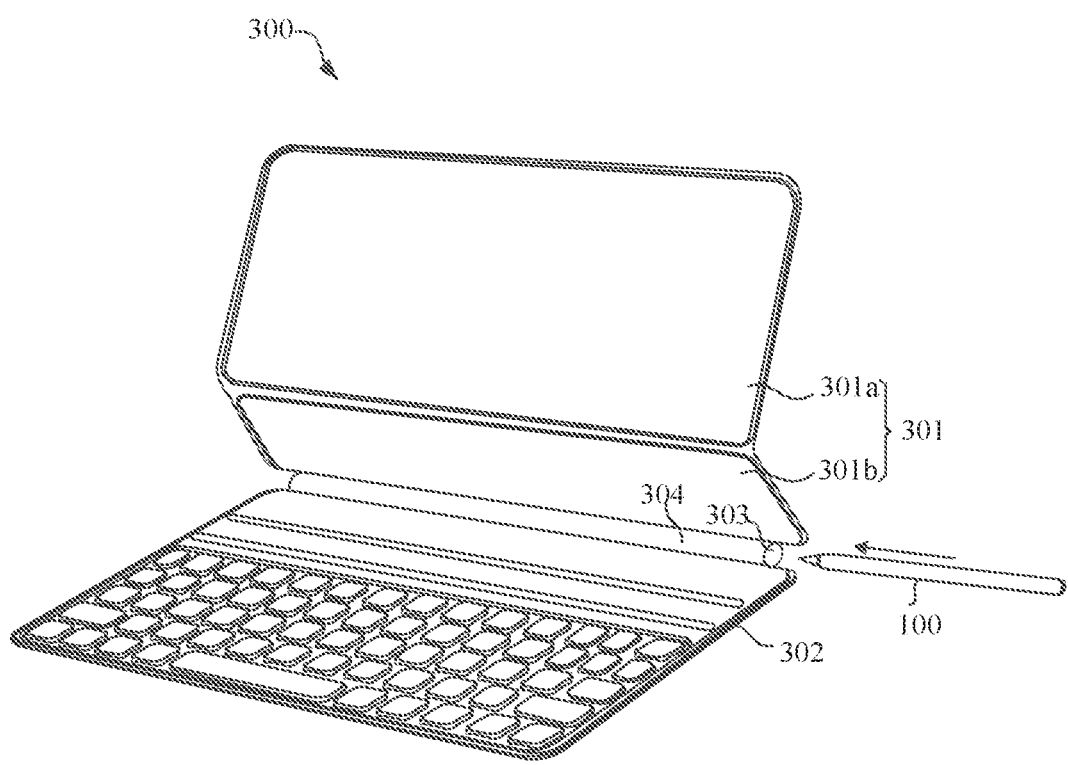
FIG. 4 is a schematic diagram of assembly of a stylus and a wireless keyboard according to an embodiment of this application.

In an embodiment, referring to FIG. 4, the wireless keyboard 300 may include a first part 301 and a second part 302. For example, the wireless keyboard 300 may include a keyboard body and a keyboard cover. The first part 301 may be the keyboard cover, and the second part 302 may be the keyboard body. The first part 301 is configured to hold the electronic device 200, and the second part 302 may be provided with a key, a touch panel, and the like for user operation.

When the wireless keyboard 300 is in use, the first part 301 and the second part 302 of the wireless keyboard 300 need to be opened, and when the wireless keyboard 300 is not in use, the first part 301 and the second part 302 of the wireless keyboard 300 can be closed. In an embodiment, the first part 301 and the second part 302 of the wireless keyboard 300 are rotatably connected. For example, the first part 301 and the second part 302 may be connected through a rotating shaft or a hinge, or in some examples, the first part 301 and the second part 302 are rotatably connected through a flexible material (for example, a leather material or a cloth material). Alternatively, in some examples, the first part 301 and the second part 302 may be integrally formed, and a joint between the first part 301 and the second part 302 is processed by thinning, so that the joint between the first part 301 and the second part 302 may be bent. The first part 301 and the second part 302 may be connected by using, without limitation to, the foregoing rotatable connection manners.

The first part 301 may include at least two brackets that are rotatably connected. For example, referring to FIG. 4, the first part 301 includes a first bracket 301*a* and a second bracket 301*b*. The first bracket 301*a* is rotatably connected to the second bracket 301*b*. During use of the electronic device 200, both the first bracket 301*a* and the second bracket 301*b* may be used to support the electronic device 200 (refer to FIG. 1). Alternatively, the first bracket 301*a* supports the second bracket 301*b*, and the second bracket 301b supports the electronic device 200. Referring to FIG. 4, the second bracket 301b and the second part 302 are rotatably connected.

Referring to FIG. 4, to accommodate the stylus 100, the wireless keyboard 300 may be provided with an accommodating portion 303 for accommodating the stylus 100. Referring to FIG. 4, the accommodating portion 303 is a cylindrical chamber. When being accommodated, the stylus 100 is inserted into the accommodating chamber in a direction of the arrow in FIG. 4. In this embodiment, referring to FIG. 4, the second part 302 and the second bracket 301b are rotatably connected by using a connecting portion 304, and the connecting portion 304 is provided with the accommodating portion 303. The connecting portion 304 may be a rotating shaft.

Figure 5A:
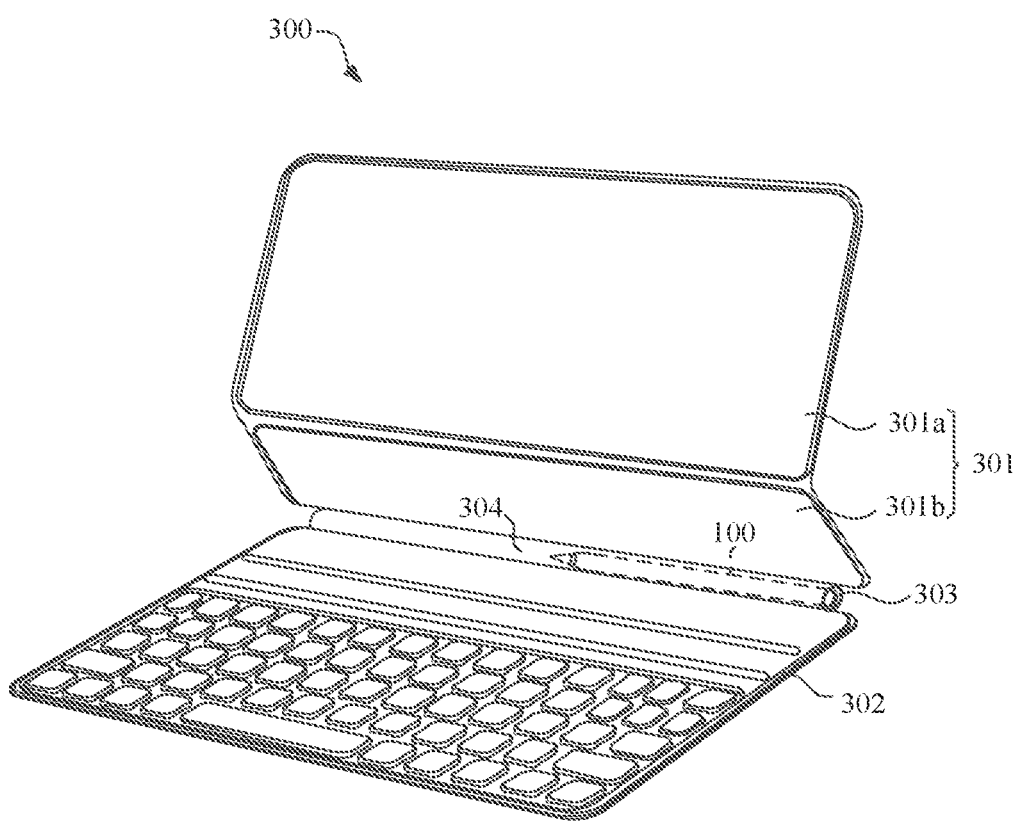
FIG. 5A is a schematic diagram of a stylus being accommodated in an accommodating portion of a wireless keyboard according to an embodiment of this application.
Figure 5B:
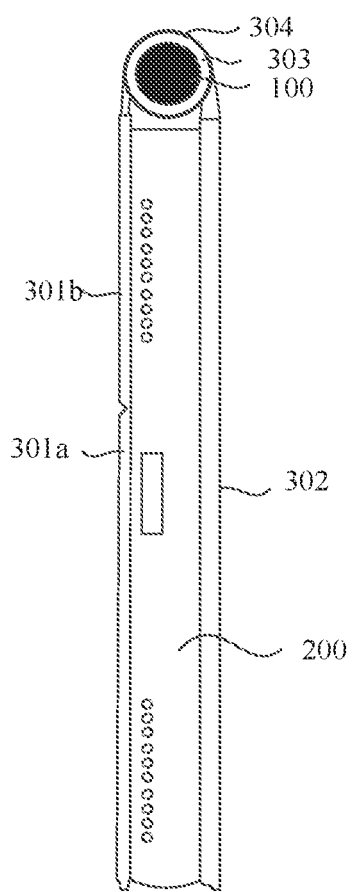
FIG. 5B is a schematic side view of an electronic device, a stylus, and a wireless keyboard according to an embodiment of this application.

FIG. 5A is a schematic diagram of a stylus being accommodated in an accommodating portion of a wireless keyboard according to an embodiment of this application; and FIG. 5B is a schematic side view of a stylus being accommodated in an accommodating portion of a wireless keyboard according to an embodiment of this application. Referring to FIG. 5B, the accommodating portion 303 is a circular chamber, and an inner diameter of the accommodating portion 303 is larger than an outer diameter of the stylus 100.

To prevent the stylus 100 from dropping from the accommodating portion 303, in an embodiment, a magnetic material may be provided on the inner wall of the accommodating portion 303, and a magnetic material may be provided in the stylus 100. The stylus 100 is adsorbed in the accommodating portion 303 by magnetic adsorption between the magnetic materials. Certainly, in some examples, the stylus 100 may be fastened to the accommodating portion 303 by, but not limited to, magnetic adsorption. For example, the stylus 100 may alternatively be fastened to the accommodating portion 303 by buckling.

To help the stylus 100 to be taken out of the accommodating portion 303, an eject structure may be provided in the accommodating portion 303. For example, when one end of the stylus 100 is pressed, an eject mechanism may drive one end of the stylus 100 to eject from the accommodating portion 303.

Figure 6:
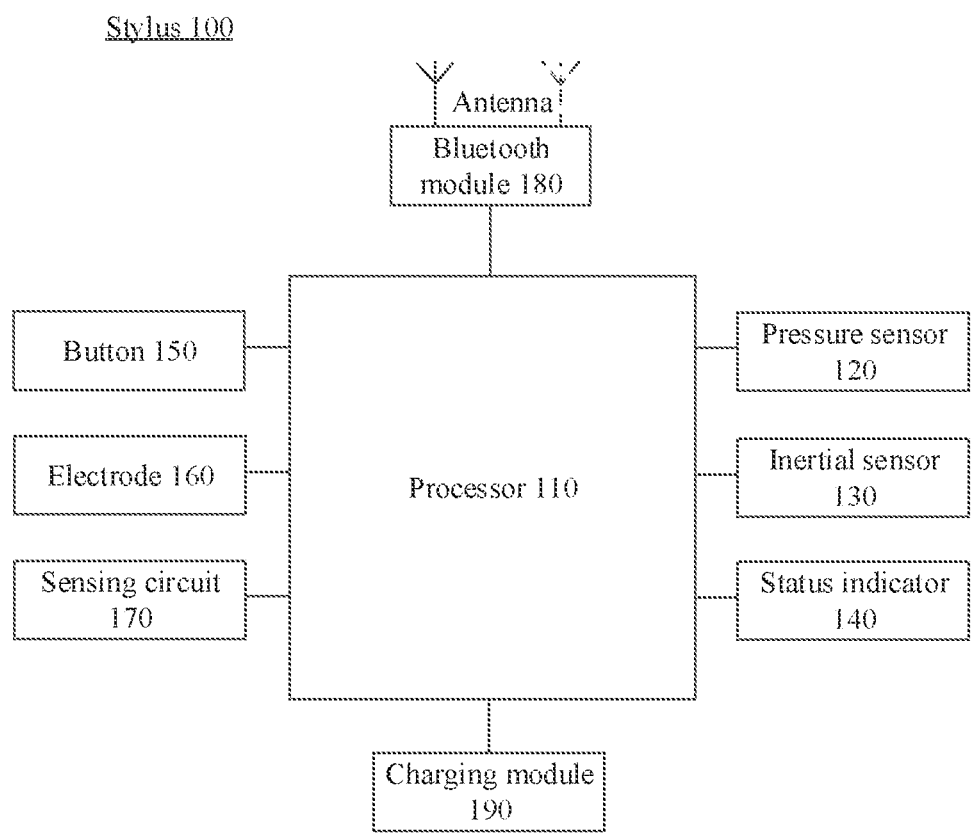
FIG. 6 is a schematic diagram of a hardware structure of a stylus according to an embodiment of this application.

FIG. 6 is a schematic diagram of a hardware structure of a stylus according to an embodiment of this application. Referring to FIG. 6, the stylus 100 may have a processor 110. The processor 110 may include a storage and processing circuit for supporting an operation of the stylus 100. The storage and processing circuit may include a storage device such as a non-volatile memory (for example, a flash memory or another electrically programmable read-only memory configured as a solid state drive), a volatile memory (for example, a static or dynamic random access memory), or the like. The processing circuit in the processor 110 may be configured to control the operation of the stylus 100. The processing circuit may be based on one or more microprocessors, microcontrollers, digital signal processors, baseband processors, power management units, audio chips, application specific integrated circuits, and the like.

The stylus 100 may include one or more sensors. For example, the sensor(s) may include a pressure sensor 120. The pressure sensor 120 may be disposed on the writing end 11 of the stylus 100 (as shown in FIG. 2B). Certainly, the pressure sensor 120 may alternatively be disposed in the barrel 20 of the stylus 100, so that after one end of the tip 10 of the stylus 100 is subjected to a force, the other end of the tip 10 moves to act on the pressure sensor 120. In an embodiment, the processor 110 may adjust, based on the pressure detected by the pressure sensor 120, the thickness of lines written using the tip 10 of the stylus 100.

The sensors may further include an inertial sensor 130. The inertial sensor 130 may include a three-axis accelerometer and a three-axis gyroscope, and/or other components for measuring movement of the stylus 100, for example, a three-axis magnetometer may be included in the sensor in a nine-axis inertial sensor structure. The sensors may further include additional sensors, such as a temperature sensor, an ambient light sensor, a light-based proximity sensor, a contact sensor, a magnetic sensor, a pressure sensor, and/or other sensors.

The stylus 100 may include a status indicator 140 such as a light emitting diode and a button 150. The status indicator 140 is configured to inform a user of a status of the stylus 100. The button 150 may include a mechanical button and a non-mechanical button, and the button 150 may be configured to collect press-button information from a user.

In this embodiment of this application, the stylus 100 may include one or more electrodes 160 (for details, refer to the descriptions in FIG. 2B). One of the electrodes 160 may be located at the writing end of the stylus 100, and one of the electrodes 160 may be located inside the tip 10. Reference may be made to the foregoing relevant descriptions.

The stylus 100 may include a sensing circuit 170. The sensing circuit 170 may sense capacitive coupling between the electrodes 160 and drive lines of a capacitive touch sensor panel that interacts with the stylus 100. The sensing circuit 170 may include an amplifier for receiving a capacitance reading from the capacitive touch sensor panel, a clock for generating a demodulation signal, a phase shifter for generating a phase shifted demodulation signal, a mixer for demodulating a capacitance reading by using an in-phase demodulation frequency component, and a mixer for demodulating a capacitance reading by using a quadrature demodulation frequency component. Results of demodulation by the mixers may be used for determining an amplitude proportional to a capacitance, so that the stylus 100 can sense contact with the capacitive touch sensor panel.

It can be understood that, according to an actual need, the stylus 100 may include a microphone, a speaker, an audio generator, a vibrator, a camera, a data port, and other devices. A user may use these devices to provide commands to control operations of the stylus 100 and the electronic device 200 that interacts with the stylus 100, and receive status information and other output.

The processor 110 may be configured to run software for controlling the operation of the stylus 100 in the stylus 100. During the operation of the stylus 100, the software running on the processor 110 may process sensor inputs, button inputs, and inputs from other devices to monitor movement of the stylus 100 and other user inputs. The software running on the processor 110 may detect a user command and may communicate with the electronic device 200.

To support wireless communication between the stylus 100 and the electronic device 200, the stylus 100 may include a wireless module. In FIG. 6, a bluetooth module 180 is used as an example of the wireless module for description. The wireless module may alternatively be a Wi-Fi hotspot module, a Wi-Fi peer-to-peer module, or the like. The bluetooth module 180 may include a radio frequency transceiver, such as a transceiver. The bluetooth module 180 may further include one or more antennas. The transceiver may transmit and/or receive a wireless signal by using the antenna(s). The wireless signal may be a bluetooth signal, a wireless local area network signal, a remote signal such as a cellular telephone signal, a near field communication signal, or other wireless signals based on a type of the wireless module.

The stylus 100 may further include a charging module 190, and the charging module 190 may support charging of the stylus 100 and provide power for the stylus 100.

It should be understood that the electronic device 200 in this embodiment of this application may be user equipment (user equipment, UE), a terminal (terminal), or the like. For example, the electronic device 200 may be a portable android device (portable android device, PAD), a personal digital assistant (personal digital assistant, PDA), a handheld device with a wireless communication function, a computing device, a vehicle-mounted device, or a wearable device, a mobile terminal or fixed terminal with a touchscreen such as a virtual reality (virtual reality, VR) terminal device, an augmented reality (augmented reality, AR) terminal device, a wireless terminal in industrial control (industrial control), a wireless terminal in self driving (self driving), a wireless terminal in remote medical (remote medical), a wireless terminal in a smart grid (smart grid), a wireless terminal in transportation safety (transportation safety), a wireless terminal in a smart city (smart city), or a wireless terminal in a smart home (smart home). The form of the terminal device is not specifically limited in the embodiments of this application.

Figure 7:
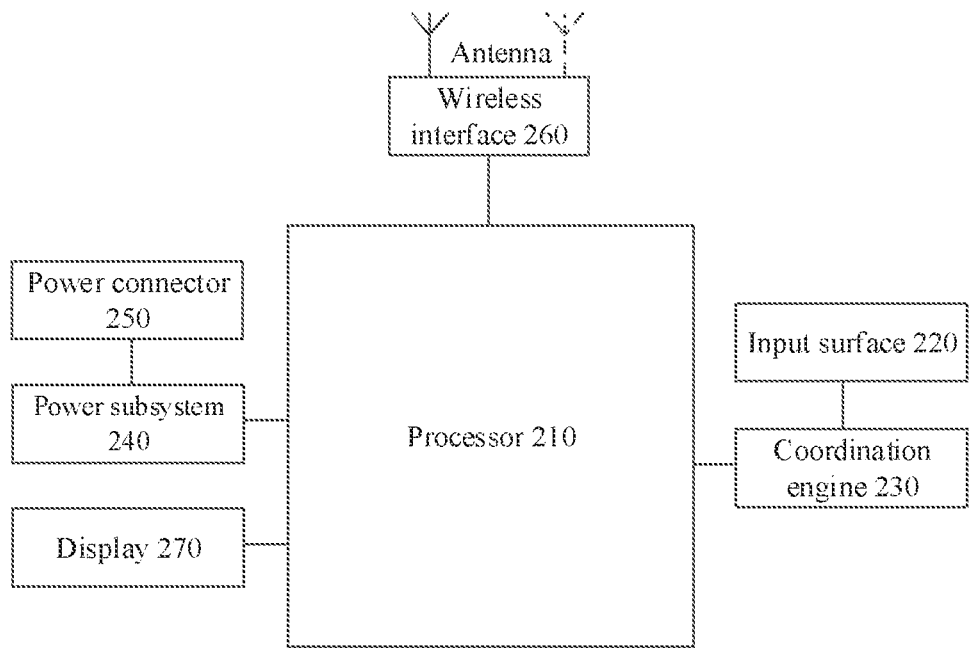
FIG. 7 is a schematic diagram of a hardware structure of an electronic device according to an embodiment of this application.

FIG. 7 is a schematic diagram of a hardware structure of an electronic device according to an embodiment of this application. Referring to FIG. 7, the electronic device 200 may include a plurality of subsystems. The subsystems cooperate to perform, coordinate, or monitor one or more operations or functions of the electronic device 200 The electronic device 200 includes a processor 210, an input surface 220, a coordination engine 230, a power subsystem 240, a power connector 250, a wireless interface 260, and a display 270.

For example, the coordination engine 230 may be configured to: communicate with other subsystems of the electronic device 200 and/or process data: communicate with a stylus 100 and/or exchange data; measure and/or obtain output of one or more analog or digital sensors (for example, a touch sensor); measure and/or obtain output of one or more sensor nodes in a sensor node array (for example, a capacitive sensing node array); receive and locate a signal from a tip of the stylus 100 and a ring signal; locate the stylus 100 based on a position of an intersection area of the tip signal and a position of an intersection area of the ring signal; and so on.

The coordination engine 230 of the electronic device 200 includes or is otherwise communicatively coupled to a sensor layer located under an input surface 220 or integrated with the input surface. The coordination engine 230 locates the stylus 100 on the input surface 220 by using the sensor layer, and estimates an angular position of the stylus 100 relative to a plane on which the input surface 220 lies, by using the techniques described herein. In an embodiment, the input surface 220 may be referred to as a touchscreen 201.

For example, the sensor layer of the coordination engine 230 of the electronic device 200 is a grid of capacitive sensing nodes arranged in columns and rows. More specifically, an array of column traces is arranged perpendicular to an array of row traces. The sensor layer may be separated from other layers of the electronic device, or the sensor layer may be disposed directly on another layer. The other layers are, for example but not limited to: a display stack layer, a force sensor layer, a digitizer layer, a polarizer layer, a battery layer, a structural or decorative shell layer, and the like.

The sensor layer can operate in various modes. If the sensor layer operates in a mutual capacitance mode, the column traces and the row traces form a single capacitive sensing node at each overlapping point (for example, a "vertical" mutual capacitance). If the sensor layer operates in a self-capacitance mode, the column traces and the row traces form two (vertically aligned) capacitive sensing nodes at each overlapping point. In another embodiment, if the sensor layer operates in a mutual capacitance mode, adjacent column traces and/or adjacent row traces may form a single capacitive sensing node (for example, a "horizontal" mutual capacitance). As described above, the sensor layer may detect presence of the tip 10 of the stylus 100 and/or touch by a user's finger by monitoring changes in capacitance (for example, mutual capacitance or self-capacitance) presented at each capacitive sensing node. In many cases, the coordination engine 230 may be configured to detect, by capacitive coupling, tip and ring signals received from the stylus 100 through the sensor layer.

The tip signal and/or the ring signal may include specific information and/or data that may be configured to cause the electronic device 200 to recognize the stylus 100. Such information is generally referred to as "stylus identity" information herein. Such information and/or data may be received by the sensor layer, and interpreted, decoded, and/or demodulated by the coordination engine 230.

The processor 210 may use the stylus identity information to simultaneously receive input from more than one stylus. Specifically, the coordination engine 230 may be configured to transmit a position and/or an angular position of each of the styluses detected by the coordination engine 230 to the processor 210. In other cases, the coordination engine 230 may also transmit information about relative positions and/or relative angular positions of the plurality of styluses detected by the coordination engine 230 to the processor 210. For example, the coordination engine 220 may notify the processor 210 of a position of a detected first stylus relative to a detected second stylus.

In other cases, the tip signal and/or the ring signal may further include specific information and/or data for enabling the electronic device 200 to identify a specific user. Such information is generally referred to as "user identity" information herein.

The coordination engine 230 may forward the user identity information (if detected and/or recovered) to the processor 210. If the user identity information cannot be recovered from the tip signal and/or the ring signal, the coordination engine 230 may optionally indicate to the processor 210 that the user identity information is unavailable. The processor 210 can utilize the user identity information (or absence of such information) in any suitable manner, including but not limited to: accepting or denying input from the specific user, allowing or denying access to a specific function of the electronic device, and the like. The processor 210 may use the user identity information to simultaneously receive input from more than one user.

In still other cases, the tip signal and/or ring signal may include specific information and/or data that may be configured to cause the electronic device 200 to identify a setting or preference of the user or the stylus 100. Such information is generally referred to as "stylus settings" information herein.

The coordination engine 230 may forward the stylus settings information (if detected and/or recovered) to the processor 210. If the stylus settings information cannot be recovered from the tip signal and/or the ring signal, the coordination engine 230 may optionally indicate to the processor 210 that the stylus settings information is unavailable. The electronic device 200 can utilize the stylus settings information (or absence of such information) in any suitable manner, including but not limited to: applying a setting to the electronic device, applying a setting to a program running on the electronic device, changing a line thickness, a color, a pattern presented by a graphics program of the electronic device, changing a setting of a video game operated on the electronic device, and the like.

In general, the processor 210 may be configured to perform, coordinate, and/or manage functions of the electronic device 200. Such functions may include, but are not limited to, communicating with and/or exchanging data with other subsystems of the electronic device 200: communicating with and/or exchanging data with the stylus 100; performing data communication and/or data exchange over a wireless interface: performing data communication and/or data exchange over a wired interface; facilitating exchange of power through a wireless (for example, inductive or resonant) or wired interface; receiving position(s) and angular position(s) of one or more styluses; and so on.

The processor 210 may be implemented as any electronic device capable of processing, receiving, or transmitting data or instructions. For example, the processor may be a microprocessor, a central processing unit, an application specific integrated circuit, a field programmable gate array, a digital signal processor, an analog circuit, a digital circuit, or a combination of these devices. The processor may be a single-threaded or multi-threaded processor. The processor may be a single-core or multi-core processor.

During use, the processor 210 may be configured to access a memory in which instructions are stored. The instructions may be configured to cause the processor to perform, coordinate, or monitor one or more operations or functions of the electronic device 200.

The instructions stored in the memory may be configured to control or coordinate operations of other components of the electronic device 200. The components are, for example but not limited to, another processor, an analog or digital circuit, a volatile or nonvolatile memory module, a display, a speaker, a microphone, a rotary input device, a button, or other physical input devices, a biometric authentication sensor and/or system, a force or touch input/output component, a communications module (for example, a wireless interface and/or a power connector), and/or a haptic device or a haptic feedback device.

The memory may further store electronic data for use by the stylus or the processor. For example, the memory may store electronic data or content (for example, a media file, a document, and an application program), a device setting and preference, a timing signal and a control signal, or data, a data structure, or a database for various modules, and a file or configuration related to detecting the tip signal and/or the ring signal. The memory may be configured as any type of memory. For example, the memory may be implemented as a random access memory, a read only memory, a flash memory, a removable memory, other types of storage elements, or a combination of such devices.

The electronic device 200 further includes the power subsystem 240. The power subsystem 240 may include a battery or other power sources. The power subsystem 240 may be configured to provide power to the electronic device 200. The power subsystem 240 may also be coupled to the power connector 250. The power connector 250 may be any suitable connector or port, and may be configured to receive power from an external power source and/or configured to provide power to an external load. For example, in some embodiments, the power connector 250 may be configured to recharge a battery within the power subsystem 240. In another embodiment, the power connector 250 may be configured to transfer power stored in (or available to) the power subsystem 240 to the stylus 100.

The electronic device 200 further includes the wireless interface 260 to facilitate electronic communication between the electronic device 200 and the stylus 100. In an embodiment, the electronic device 200 may be configured to communicate with the stylus 100 via a low-energy bluetooth communications interface or a near field communications interface. In other examples, the communications interface helps implement electronic communication between the electronic device 200 and an external communications network, a device, or a platform.

The wireless interface 260 (whether the communications interface between the electronic device 200 and the stylus 100 or another communications interface) may be implemented as one or more wireless interfaces, bluetooth interfaces, near field communications interfaces, magnetic interfaces, universal serial bus interfaces, inductive interfaces, resonant interfaces, capacitive coupling interfaces, Wi-Fi interfaces, TCP/IP interfaces, network communications interfaces, optical interfaces, acoustic interfaces, or any traditional communications interfaces.

The electronic device 200 further includes a display 270. The display 270 may be located behind the input surface 220, or may be integrated therewith. The display 270 may be communicatively coupled to the processor 210. The processor 210 may use the display 270 to present information to a user. In many cases, the processor 210 uses the display 270 to present an interface with which a user may interact. In many cases, the user manipulates the stylus 100 to interact with the interface.

It will be apparent to those skilled in the art that some of the specific details presented above with respect to the electronic device 200 may not be required to practice particular embodiments or their equivalents. Similarly, other electronic devices may include more subsystems, modules, components, and the like. Some sub-modules may be implemented as software or hardware, where appropriate. Therefore, it should be understood that the foregoing descriptions are not intended to be exhaustive or to limit the disclosure to the precise form set forth herein. On the contrary, it will be obvious to those of ordinary skill in the art that many modifications and variations are possible in light of the foregoing teachings.

Figure 8:
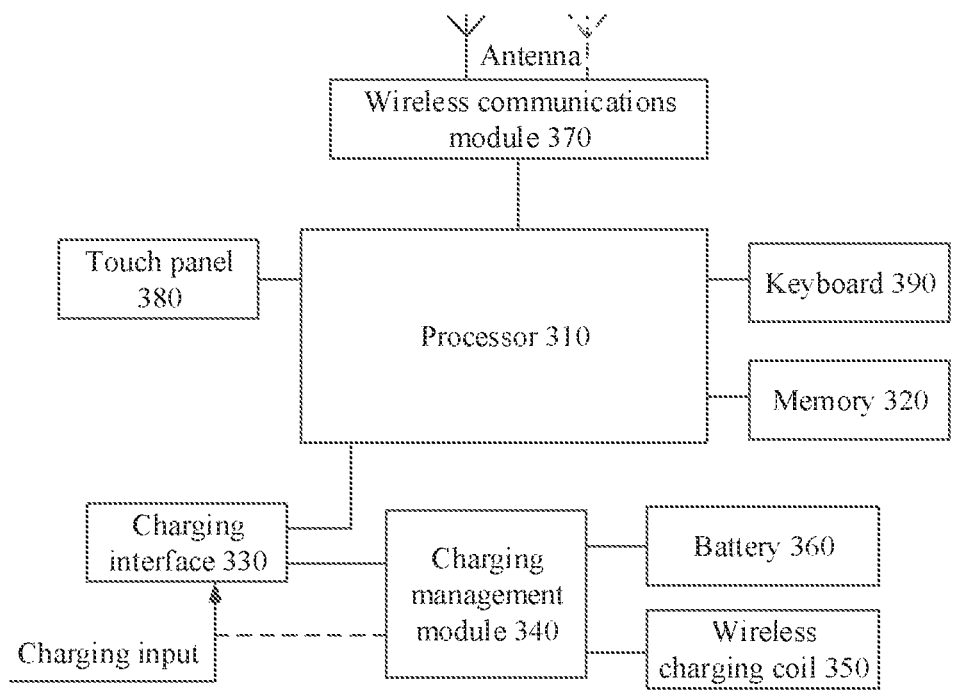
FIG. 8 is a schematic diagram of a hardware structure of a wireless keyboard according to an embodiment of this application.

FIG. 8 is a schematic diagram of a hardware structure of a wireless keyboard according to an embodiment of this application. Referring to FIG. 8, the wireless keyboard 300 may include a processor 310, a memory 320, a charging interface 330, a charging management module 340, a wireless charging coil 350, a battery 360, a wireless communications module 370, a touch panel 380, and a keyboard 390.

The processor 310, the memory 320, the charging interface 330, the charging management module 340, the battery 360, the wireless communications module 370, the touch panel 380, the keyboard 390, and the like may all be disposed on a keyboard body of the wireless keyboard 300 (that is, a second part 302 shown in FIG. 4). The wireless charging coil 350 may be disposed in a connecting portion 304 (as shown in FIG. 4) for movably connecting the keyboard body and a bracket. It should be understood that the structure illustrated in this embodiment does not constitute a specific limitation on the wireless keyboard 300. In some other embodiments, the wireless keyboard 300 may include components more or fewer than those shown in the figure, or combine some components, or split some components, or have different component arrangements. The components shown in the figure may be implemented by using hardware, software, or a combination of software and hardware.

The memory 320 may be configured to store program code, such as program code for wirelessly charging the stylus 100. The memory 320 may further store a bluetooth address that uniquely identifies the wireless keyboard 300. In addition, the memory 320 may further store connection data of an electronic device that has been successfully paired with the wireless keyboard 300 before. For example, the connection data may be a bluetooth address of the electronic device that has been successfully paired with the wireless keyboard 300. Based on the connection data, the wireless keyboard 300 can be automatically paired with the electronic device without having to configure a connection therewith, for example, performing a validity check. The bluetooth address may be a media access control (media access control. MAC) address.

The processor 310 may be configured to: execute the foregoing application program code, and invoke relevant modules to implement the functions of the wireless keyboard 300 in the embodiments of this application, for example, implement a wired charging function, reverse wireless charging function, wireless communication function, and the like of the wireless keyboard 300. The processor 310 may include one or more processing units, and different processing units may be separate devices or may be integrated into one or more processors 310. The processor 310 may specifically be an integrated control chip, or may include a circuit including various active and/or passive components, and the circuit is configured to perform the functions of the processor 310 described in the embodiments of this application. The processor of the wireless keyboard 300 may be a microprocessor.

The wireless communications module 370 may be configured to support data exchange between the wireless keyboard 300 and other electronic devices over wireless communication including bluetooth (bluetooth, BT), a global navigation satellite system (global navigation satellite system, GNSS), a wireless local area network (wireless local area network, WLAN) (for example, a wireless fidelity (wireless fidelity, Wi-Fi) network), frequency modulation (frequency modulation, FM), near field communication (near field communication, NFC), an infrared (infrared, IR) technology, and the like.

In some embodiments, the wireless communications module 370 may be a bluetooth chip. The wireless keyboard 300 may be a bluetooth keyboard. The wireless keyboard 300 may be paired with a bluetooth chip of another electronic device through the bluetooth chip and establish a wireless connection, so as to realize wireless communication between the wireless keyboard 300 and the another electronic device through the wireless connection.

In addition, the wireless communications module 370 may further include an antenna. The wireless communications module 370 receives an electromagnetic wave via the antenna, performs frequency modulation and filtering on an electromagnetic wave signal, and sends the processed signal to the processor 310. The wireless communications module 370 may also receive a to-be-sent signal from the processor 310, perform frequency modulation and amplification on the signal, and transmits the signal as an electromagnetic wave using the antenna.

In some embodiments, the wireless keyboard 300 may support wired charging. Specifically, the charging management module 340 may receive charging input of a wired charger through the charging interface 330.

In other embodiments, the wireless keyboard 300 may support forward wireless charging. The charging management module 340 may receive a wireless charging input through the wireless charging coil 350 of the wireless keyboard 300. Specifically, the charging management module 340 is connected to the wireless charging coil 350 through a matching circuit. The wireless charging coil 350 may be coupled to a wireless charging coil of a wireless charger, and induce an alternating electromagnetic field emitted by the wireless charging coil 350 of the wireless charger to generate an alternating current signal. The alternating current signal generated by the wireless charging coil 350 is transmitted to the charging management module 340 through the matching circuit, so as to charge the battery 300 wirelessly.

The charging management module 340 may further provide power for the wireless keyboard 300 while charging the battery 330. The charging management module 340 receives input from the battery 330, to provide power for the processor 310, the memory 320, an external memory, the wireless communications module 370, and the like. The charging management module 340 may further be configured to monitor parameters such as battery capacity of the battery 360, a cycle count of the battery; and a state of health (leakage and impedance) of the battery. In some other embodiments, the charging management module 340 may alternatively be disposed in the processor 310.

In some other embodiments, the wireless keyboard 300 may support reverse wireless charging. Specifically, the charging management module 340 may further receive input from the charging interface 330 or the battery 360, and convert a direct current signal input from the charging interface 330 or the battery 360 into an alternating current signal. The alternating current signal is transmitted to the wireless charging coil 350 through the matching circuit. The wireless charging coil 350 may generate an alternating electromagnetic field upon receiving the alternating current signal. A wireless charging coil of another mobile terminal may perform wireless charging upon sensing the alternating electromagnetic field. That is, the wireless keyboard 300 may further wirelessly charge the another mobile terminal. In an embodiment, the wireless charging coil 350 may be disposed in an accommodating portion 303 of the wireless keyboard 300, and a wireless charging coil is disposed in the barrel 20 of a stylus 100. When the stylus 100 is placed in the accommodating portion 303, the wireless keyboard 300 may charge the stylus 100 through the wireless charging coil 350.

It should be noted that the matching circuit may be integrated in the charging management module 340, or the matching circuit may be independent of the charging management module 340, which is not limited in the embodiments of this application. FIG. 8 is a schematic diagram of a hardware structure of the wireless keyboard 300 by using as an example that the matching circuit may be integrated in the charging management module 340.

The charging interface 350 may be configured to provide a wired connection for charging or communication between the wireless keyboard 300 and another electronic device (for example, the wired charger of the wireless keyboard 300).

A touch sensor is integrated into the touch panel 380. A laptop may receive a control command of a user for the laptop through the touch panel 380 and the keyboard 390.

It should be understood that the structure illustrated in this embodiment of this application does not constitute a specific limitation on the wireless keyboard 300. The wireless keyboard 300 may have more or fewer components than those shown in FIG. 8, may combine two or more components, or may have different component configurations. For example, a housing of the wireless keyboard 300 may further be provided with an accommodating chamber for accommodating the stylus 100. The wireless charging coil 350 is disposed in the accommodating chamber, and is configured to wirelessly charge the stylus 100 after the stylus 100 is accommodated in the accommodating chamber.

For another example, an outer surface of the wireless keyboard 300 may further include a key, an indicator light (which may indicate a state such as a battery level, an incoming/outgoing call, or a pairing mode), and a display (which may display prompt information to a user), and other components. The key may be a physical key, a touch key (used with the touch sensor), or the like, and is configured to trigger an operation such as power-on, power-off, start of charging, and end of charging.

Figure 9:
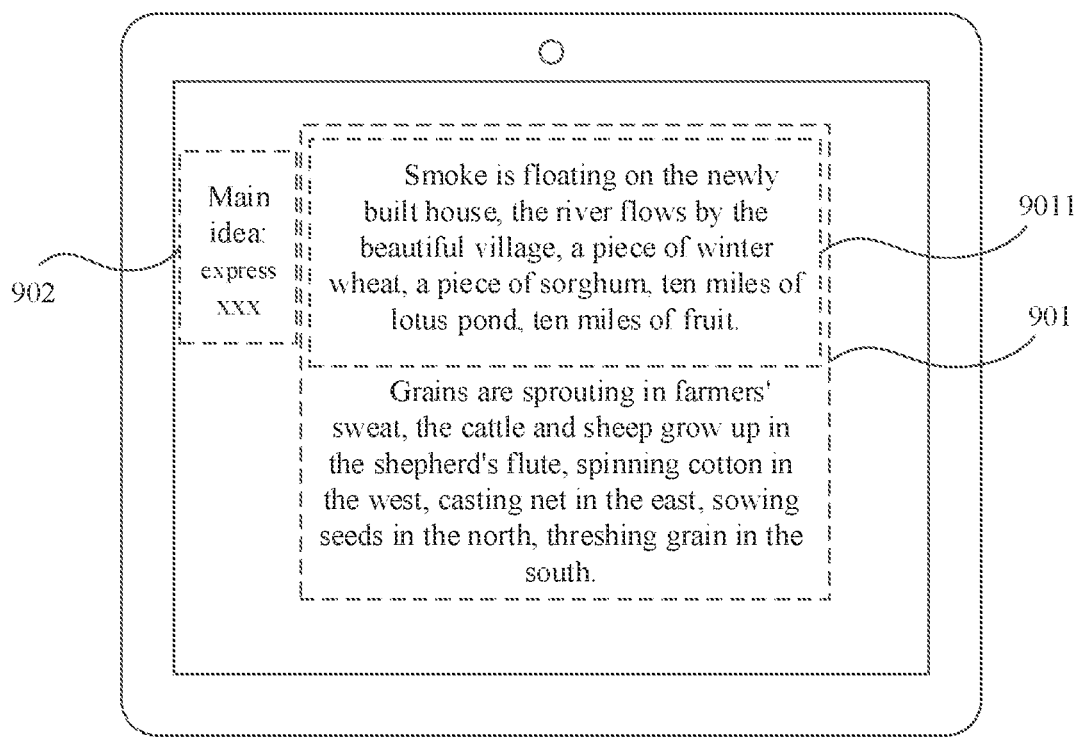
FIG. 9 is a schematic diagram of a user taking a note by using a stylus.

FIG. 9 is a schematic diagram of a user taking a note by using a stylus. As shown in FIG. 9, first content 901 is displayed on a screen of an electronic device, and the first content 901 may be content stored locally on the electronic device or online content. The first content 901 may be, but is not limited to, an identifier of an audio file, an identifier of a video file, an identifier of an electronic book, a reading page, and an image. The reading page may be one or more pages in an electronic book. It should be understood that the identifier may be a name, an image, or the like of the first content 901, and the identifier is used to distinguish different first content. It should be understood that, in FIG. 9, for example, the first content 901 is a reading page. In an embodiment, a user may use a stylus to write on the reading page, and second content 902 written by the user may be displayed on the screen of the electronic device.

Referring to FIG. 9, there is a lot of content in the reading page, and when reading a note, the user cannot directly read key content, which causes confusion to the user. For example, the user takes a note, that is, the second content 902, for a text part 9011 in the first content 901. When reading the note, the user needs to read the key content (the text part 9011 and the second content 902 written by the user), but currently there is a lot of content in the reading page, which hinders the user to read the key content.

An embodiment of this application provides a method for generating a note. The user may store to-be-stored content as a note by using a stylus, so that the user can directly read key content when reading the note, thereby improving user experience.

Figure 10A:
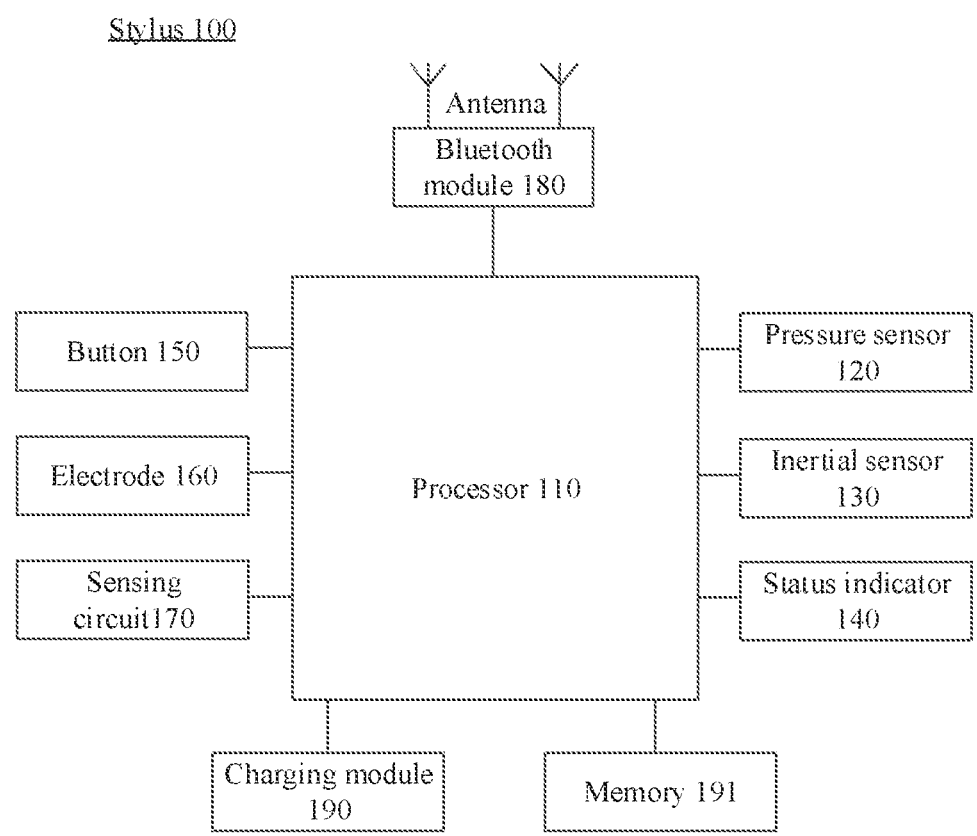
FIG. 10A is a schematic diagram of another hardware structure of a stylus according to an embodiment of this application.

Before proceeding to the method for generation a note provided in this embodiment of this application, a structure of the stylus 100 is first described. In an embodiment, compared to FIG. 6, the stylus 100 may include a memory 191, as shown in FIG. 10A. The memory 191 may be configured to store one or more computer programs, where the one or more computer programs include an instruction. The processor 110 may execute the instruction stored in the memory 191, to cause the electronic device 100 to perform various functional applications, data processing, and the like. The memory 191 may include a storage program area and a storage data area. The storage program area may store an operating system. The storage data area may store data such as a text, an image, an audio file, a video file, a contact, and the like. In addition, the memory 191 may include a high-speed random access memory, or may include a non-volatile memory. In some embodiments, the processor 110 may run the instruction stored in the memory 191 and/or an instruction stored in a memory disposed in the processor 110, to cause the electronic device 100 to perform various functional applications and data processing.

The method for generating a note provided in this embodiment of this application will be described below with reference to specific embodiments. The following embodiments may be combined with each other, and the same or similar concepts or processes may not be repeated in some embodiments.

Figure 10B:
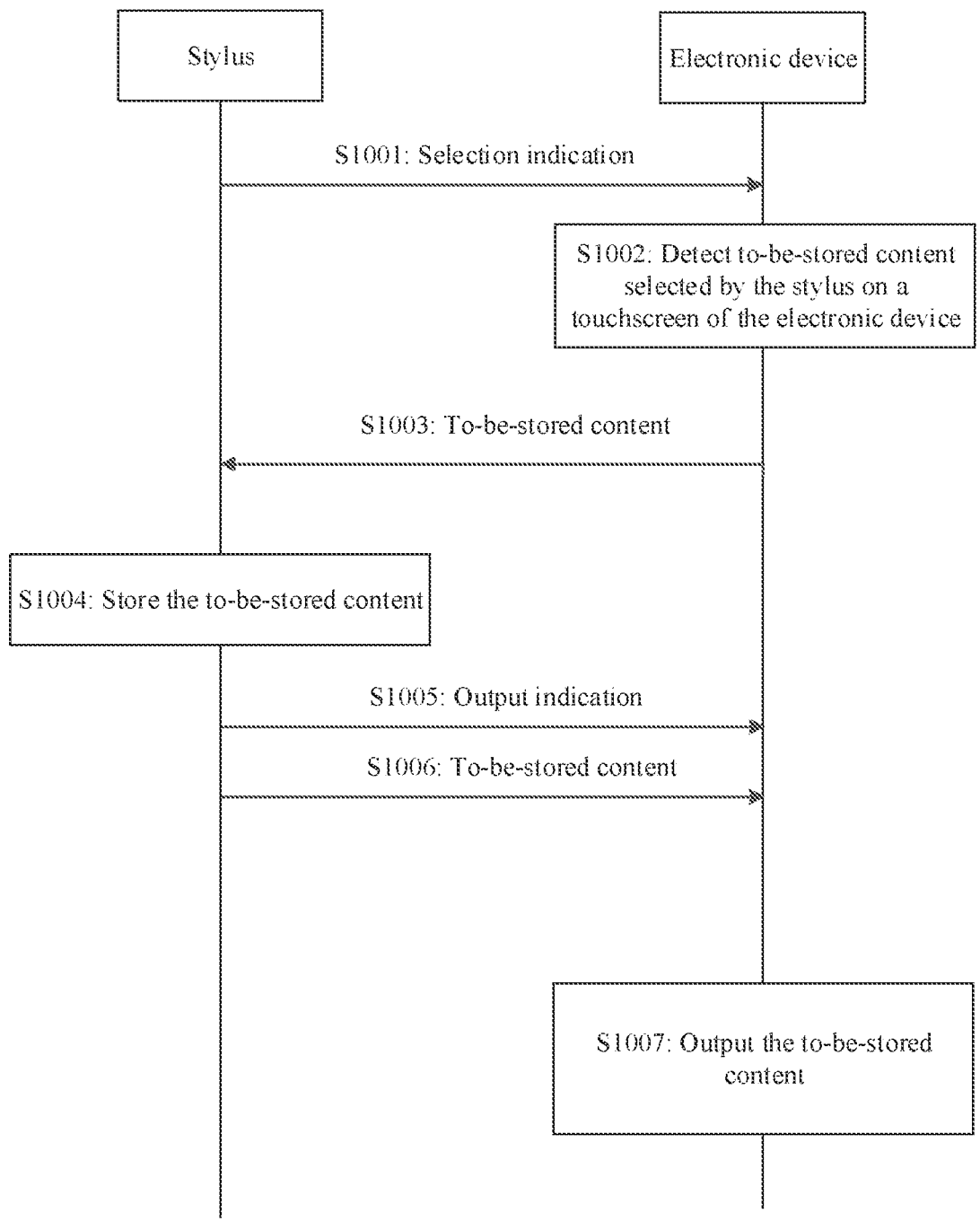
FIG. 10B is a schematic flowchart of an embodiment of a method for generating a note according to an embodiment of this application.

FIG. 10B is a schematic flowchart of an embodiment of a method for generating a note according to an embodiment of this application. As shown in FIG. 10B, the method for generating a note may include the following steps.

S1001: An electronic device detects a selection indication from a stylus.

The selection indication is used to indicate to the electronic device that the stylus is about to select to-be-stored content.

In an embodiment, if the electronic device detects that the stylus performs a first preset action, it indicates that the electronic device detects the selection indication from the stylus. In an embodiment, the first preset action may be, but is not limited to, double-tapping a touchscreen of the electronic device with the stylus, or touching and holding the touchscreen of the electronic device with the stylus.

In an embodiment, the first preset action may be: writing, by the stylus, a preset track on the touchscreen of the electronic device. For example, the preset track may be a preset text, a preset letter, a preset shape, or the like. To help the electronic device to distinguish between a track left by the stylus in writing a note and a preset track written by the stylus, the first preset action may be: writing, by the stylus, a preset track in a preset area of the touchscreen of the electronic device, where the preset area may be, but is not limited to, a center area of the touchscreen. For example, if the electronic device detects that the stylus is writing a preset letter m in the center area of the touchscreen, the electronic device may determine that a selection indication from the stylus has been detected: and if the electronic device detects that the stylus is writing the preset letter m in another area (non-preset area) of the touchscreen, the electronic device may determine that the stylus is writing a note, and m is displayed on a corresponding position in the another area of the touchscreen. This embodiment of this application does not limit the manner in which the electronic device distinguishes the track left by the stylus in writing a note and the preset track written by the stylus, and the preset area is an example.

In an embodiment, a selection key may be provided on the stylus, and the selection key may be a mechanical key or a touch key, which is not limited in this embodiment of this application. When the stylus detects that the user operates the selection key, the stylus may send a selection indication to the electronic device. For example, the stylus may send the selection indication to the electronic device by using a bluetooth module in the stylus, and the electronic device receives the selection indication from the stylus by using the bluetooth module in the electronic device.

Figure 11A:
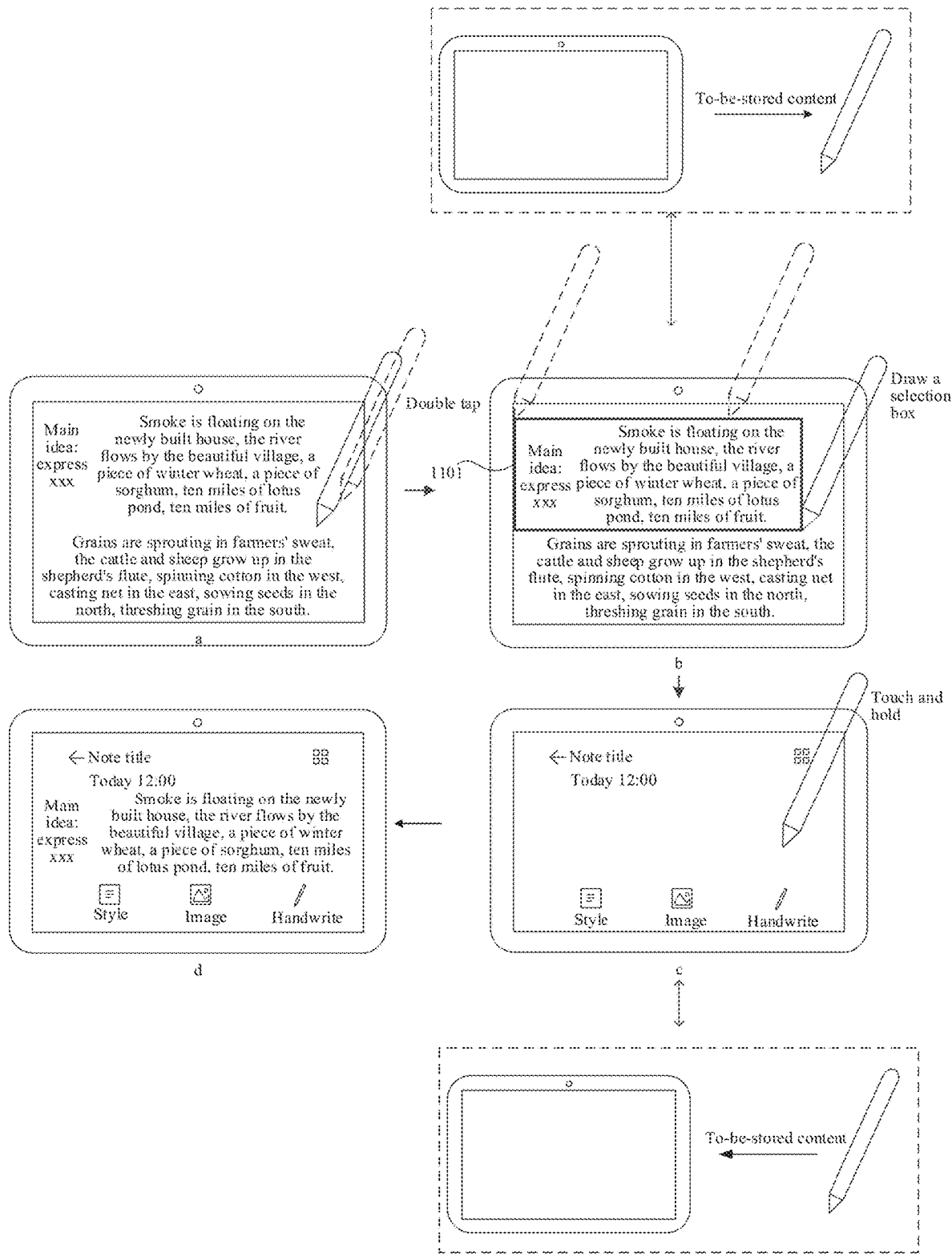
FIG. 11A is a schematic diagram of interaction between an electronic device and a stylus according to an embodiment of this application.

FIG. 11A is a schematic diagram of interaction between an electronic device and a stylus according to an embodiment of this application. Referring to a in FIG. 11A, double-tapping the touchscreen is the first preset action, and the stylus double-clicks the touchscreen of the electronic device, and the electronic device may detect the selection indication from the stylus. In a of FIG. 11A, the stylus in dotted line represents a first tap of the stylus on the touchscreen, and the stylus in solid line represents a second tap of the stylus on the touchscreen. It should be understood that in FIG. 11A, a tablet is used as an example of the electronic device for description.

S1002: The electronic device detects the to-be-stored content selected by the stylus on the touchscreen of the electronic device.

After sending the selection indication to the electronic device, the stylus may select the to-be-stored content on the touchscreen of the electronic device.

In an embodiment, the stylus may select an identifier of the to-be-stored content on the touchscreen by, but not limited to, tapping or touching and holding, so as to select the to-be-stored content. In an embodiment, the stylus may select the identifier of the to-be-stored content to select the to-be-stored content. For example, the stylus may draw a selection box to select the to-be-stored content, and the selection box may be, but not limited to, a rectangle, a circle, and an ellipse. For example, the stylus may select the to-be-stored content in a form of an underline, and at least one underline may be drawn. It should be understood that the drawing a selection box and an underline shown in this embodiment of this application are merely an example, and certainly, other methods may also be used to select the to-be-stored content, for example, highlighting and commenting.

After detecting the selection indication from the stylus, the electronic device may detect content selected by the stylus on the touchscreen, and use the content as the to-be-stored content. In an embodiment, the electronic device may detect a position on which the stylus taps, and then determine the selected to-be-stored content on the touchscreen based on arrangement of elements on the touchscreen. The elements on the touchscreen may include: a text, an image, an identifier of an audio file, an identifier of a video file, an identifier of an electronic book, and the like. For example, when the electronic device detects that the position on which the stylus taps is the identifier of the audio file, the audio file may be used as the to-be-stored content.

In an embodiment, the electronic device may perform detection for a trace of the stylus to determine whether the stylus has drawn a selection box or not, and if it is detected that the stylus has drawn the selection box, content in the selection box is used as the to-be-stored content. In an embodiment, the electronic device may perform detection for a trace of the stylus to determine whether the stylus has drawn an underline, and then content selected by the underline is used as the to-be-stored content.

Referring to b in FIG. 11A, when the stylus selects the to-be-stored content with the selection box, the stylus may draw a selection box 1101 to select "a text part 9011 and second content 902 written by the user" as the to-be-stored content. It should be understood that the to-be-stored content can be understood as key content required by the user. In b in FIG. 11A, the stylus in dotted line represents a stylus in drawing the selection box 1101, and the stylus in solid line represents a stylus upon completing drawing of the selection box 1101.

In an embodiment, when detecting that the to-be-stored content is selected by the stylus, the electronic device may display the to-be-stored content in a preview state, so that the user can view the selected to-be-stored content at any time. For example, b in FIG. 11A may be replaced by b1 and b2 in FIG. 11B. For example, the electronic device may display a preview box of the to-be-stored content on a screen, and the preview box includes the content selected by the user through the stylus. Referring to b1 in FIG. 11B, when the stylus draws a selection box 1101, the electronic device may display a preview box 1102 below the selection box 1101, and the preview box 1102 includes the to-be-stored content. Referring to b1 in FIG. 11B, for distinguishing between the selection box 1101 and the preview box 1102, a dotted box may be used to represent the preview box 1102. Certainly; other methods, such as different colors and different shapes, may also be used to distinguish the selection box 1101 and the preview box 1102, and a format of the preview box 1102 is not specifically limited in this embodiment of this application.

Figure 11B:
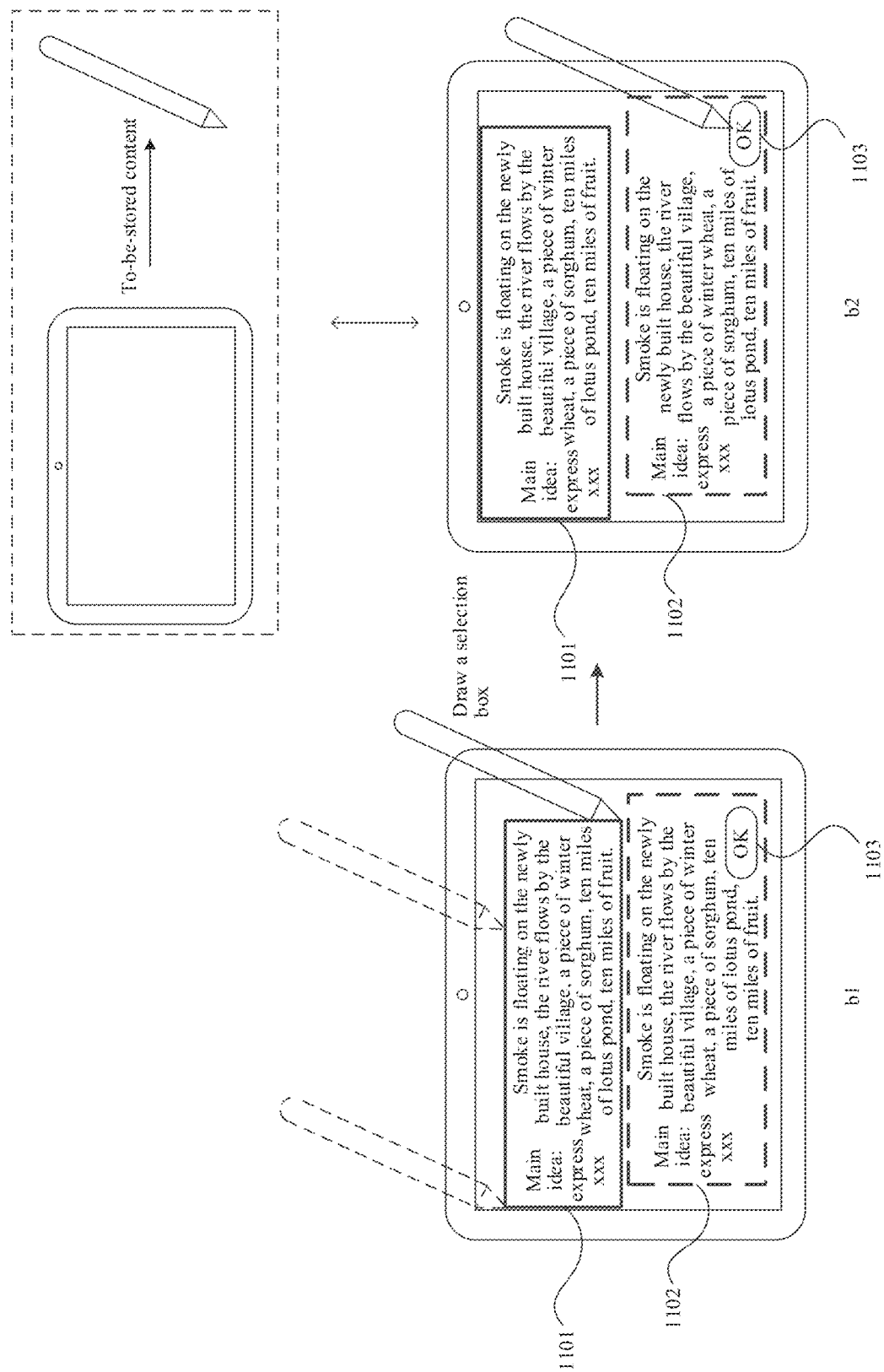
FIG. 11B is another schematic diagram of interaction between an electronic device and a stylus according to an embodiment of this application.

It is conceivable that, in order not to block content displayed on the screen of the electronic device, the electronic device may display the preview box 1102 and adjust a format of the content displayed on the screen, so that the preview box 1102 is arranged on the right or left side of the selection box 1101 without covering the content on the screen, b1 in FIG. 11B is an example of the preview box 1102. When the stylus finishes drawing the selection box, the electronic device may send the to-be-stored content to the stylus.

In an embodiment, after the stylus has drawn the selection box, the user needs to confirm the to-be-stored content through the stylus, and then the electronic device sends the to-be-stored content to the stylus. In this way, accuracy of the to-be-stored content is improved, and a user can freely select the to-be-stored content, improving user experience. For example, the preview box 1102 may include a "confirm" control 1103, and the user may select the "confirm" control 1103 through the stylus to prompt the electronic device that the stylus needs to store the to-be-stored content, and then the electronic device executes S1003. For example, as shown in b2 of FIG. 11B, when the user selects the "confirm" control 1103 through the stylus, the electronic device may send the to-be-stored content to the stylus. In an embodiment, when the electronic device detects that the selection box 1101 is drawn by the stylus, a pop-up box may be displayed. The pop-up box is used to prompt the user to confirm the selected to-be-stored content, with the same function as the "confirm" control 1103. This embodiment of this application imposes no limitation on how to prompt the user to determine the selected to-be-stored content.

In an embodiment, the stylus may draw a plurality of selection boxes, and the to-be-stored content in the plurality of selection boxes may not be included on the same screen of the electronic device. For example, the reading page is used as an example. When the stylus draws a selection box on page 2, the electronic device may display a preview box on page 2, and the preview box may include to-be-stored content selected by the stylus on page 1. It should be noted that the preview box may also include the to-be-stored content selected by the stylus on page 2.

In an embodiment, the electronic device may display the to-be-stored content on page 1 and the to-be-stored content on page 2 in a form of columns or segments in the preview box. This embodiment of this application imposes no limitation on a format of displaying the to-be-stored content in the preview box.

Figure 11C:
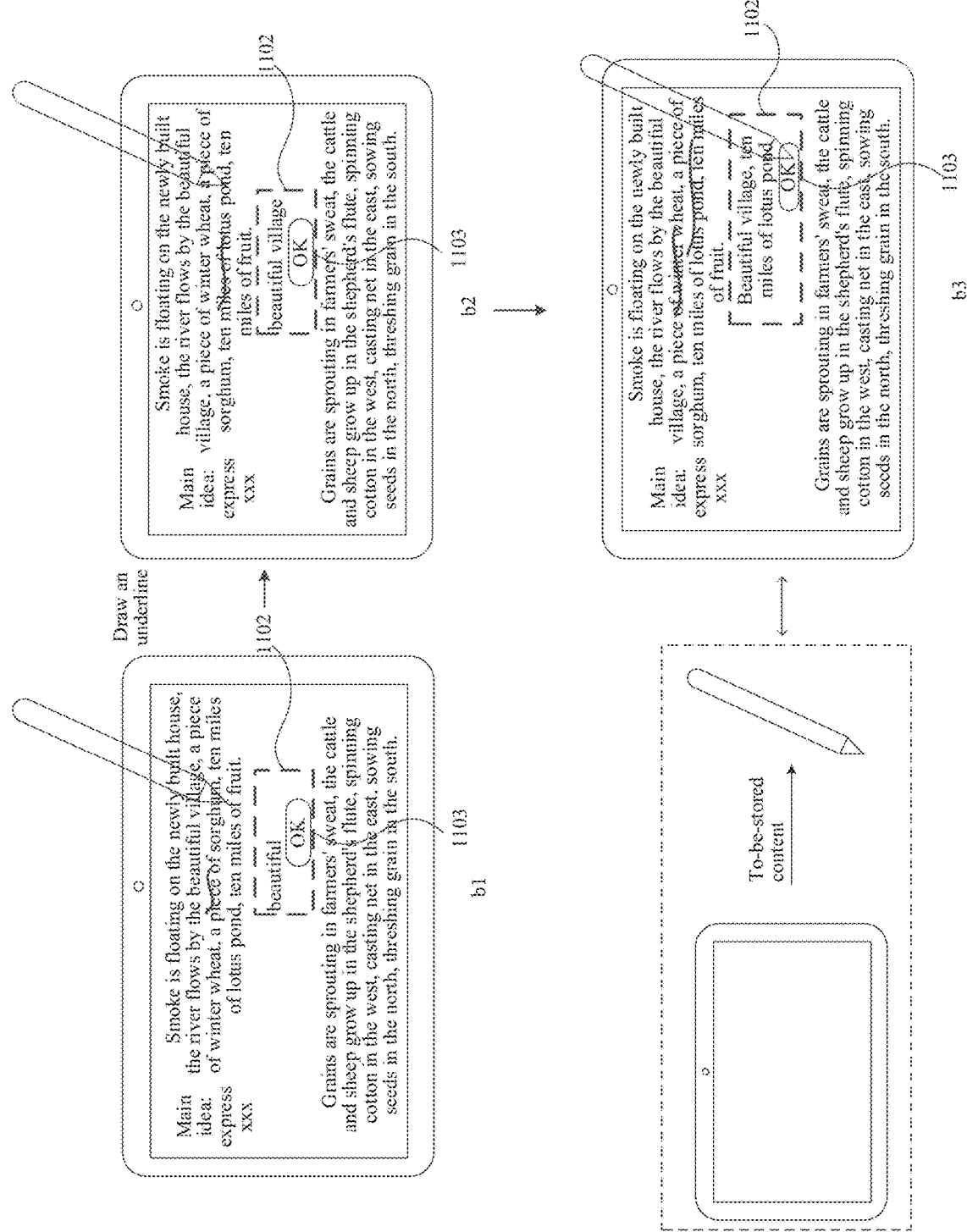
FIG. 11C is another schematic diagram of interaction between an electronic device and a stylus according to an embodiment of this application.

In an embodiment, when the stylus selects the to-be-stored content by using an underline, b in FIG. 11A may be replaced with b1 to b3 in FIG. 11C. In this embodiment, the stylus may draw a plurality of discontinuous underlines, and the electronic device may combine content selected by the plurality of discontinuous underlines to obtain the to-be-stored content.

In a process of drawing an underline with the stylus, the electronic device may detect content corresponding to the underline in real time, and then display the content selected by the stylus in the preview box in real time. For example, referring to b1 in FIG. 11C, the stylus draws an underline under "beautiful", and the electronic device may display "beautiful" in the preview box 1102. Referring to b2 in 11C, when the stylus draws an underline under "village", the electronic device may display "beautiful village" in the preview box 1102. When the stylus finishes drawing underlines, the electronic device may send the to-be-stored content to the stylus.

In an embodiment, referring to b3 in 11C, when a user selects the to-be-stored content "beautiful village" and "ten miles of lotus pond" through the stylus, the electronic device may display "beautiful village" and "ten miles of lotus pond" in the preview box 1102. Further, the user may select the "confirm" control 1103 displayed on the electronic device through the stylus to indicate the electronic device to execute S1003.

It should be understood that a, c, and d are not shown in FIG. 11B and FIG. 11C, and reference may be made to the descriptions of a in FIG. 11A. In addition, after b2 in FIG. 11B and b3 in FIG. 11C, the steps shown in c and d in FIG. 11A may be performed.

S1003: The electronic device sends the to-be-stored content to the stylus.

Based on the operation of the stylus, the electronic device may determine the to-be-stored content, and then send the to-be-stored content to the stylus. For example, the electronic device may send an audio file to the stylus.

In an embodiment, when the to-be-stored content is a text and/or an image, the electronic device may take a screenshot to obtain an image of the to-be-stored content, and then send the image of the to-be-stored content to the stylus, where the image of the to-be-stored content is the to-be-stored content. It should be understood that the electronic device may determine content in the selection box based on a position of the selection box on the touchscreen and a position of the text and/or the image displayed on the touchscreen, and then take a screenshot of the content in the selection box. In an embodiment, the text and/or the image displayed on the touchscreen includes: an original text and/or an image in the reading page, and content written by the user through the stylus.

Figure 12:
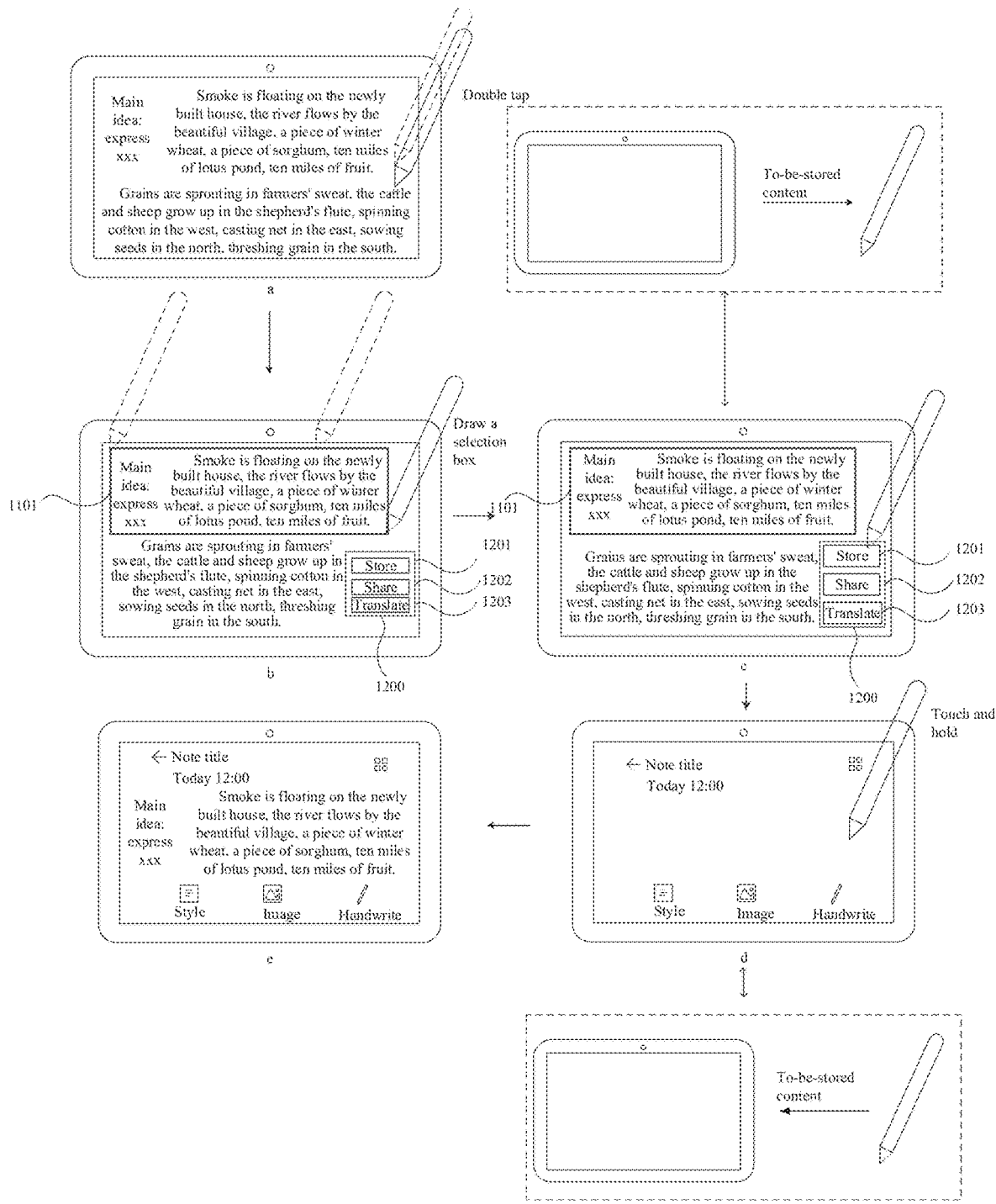
FIG. 12 is another schematic diagram of interaction between an electronic device and a stylus according to an embodiment of this application.

In an embodiment, b in FIG. 11A may be replaced with b in FIG. 12. Referring to b in FIG. 12, after the stylus selects the to-be-stored content on the touchscreen, that is, when the stylus finishes drawing the selection box, the electronic device may display a function area 1200 around the to-be-stored content, and the function area 1200 may include a processing control of the to-be-stored content. For example, the processing control in the function area 1200 may include: a store control 1201, a share control 1202, and a translate control 1203. Referring to c in FIG. 12, the stylus may select the store control 1201 to indicate the stylus of the electronic device to store the to-be-stored content. In this embodiment, when the electronic device detects that the stylus has selected the to-be-stored content, and detects that the stylus has selected the store control 1201, the electronic device may send the to-be-stored content to the stylus. It should be understood that for a, d, and e in FIG. 12, reference may be made to the relevant descriptions of a, c, and d in FIG. 11A. In an embodiment, FIG. 12 may be combined with FIG. 11B and FIG. 11C. For example, the function area 1200 shown in FIG. 12 is displayed in the preview box 1102, and the storage control 1201 in the function area 1200 may be the same function as the "confirm" control 1103 in FIG. 11B and FIG. 11C.

In an embodiment, the foregoing S1001 to S1003 may be replaced by: The electronic device sends the to-be-stored content to the stylus in response to detecting the to-be-stored content selected by the stylus. In this embodiment, the electronic device may detect a selection action of the stylus on the touchscreen, and then use content corresponding to a preset selection action performed by the stylus as the to-be-stored content. For example, the preset selection action may be, but is not limited to: performing, by the stylus, an action of "highlighting" text, performing, by the stylus, an action of "annotation", or performing, by the stylus, an action such as underlining and drawing a selection box. Correspondingly, the electronic device may use content highlighted, content annotated, or content selected by an underline or a selection box by the stylus as the to-be-stored content.

Referring to FIG. 11A, that is, the stylus may not perform a first preset action of double-tapping, and when the electronic device detects that the stylus has drawn a selection box, the electronic device may send the to-be-stored content to the stylus.

S1004: The stylus stores the to-be-stored content.

The stylus in this embodiment of this application has a storage function, and can store to-be-stored content from the electronic device. In an embodiment, referring to FIG. 10A, the stylus may include a memory, and the memory is configured to store the to-be-stored content.

S1005: The stylus sends an output indication to the electronic device.

When a user needs to generate a note including key content, the stylus may be triggered to send an output indication to the electronic device, where the output indication is used to indicate the electronic device to generate a note based on the to-be-stored content from the stylus.

Similar to S1001 of sending, by the stylus, the selection indication to the electronic device, the stylus may perform a second preset action to trigger sending of an output indication to the electronic device. The second preset action may be the same as or different from the first preset action. When the second preset action may be different from the first preset action, the electronic device may determine an indication output by the stylus, after detecting that the stylus performs the second preset action. When the second preset action may be the same as the first preset action, the electronic device may store the detected first preset action, and if detecting that the stylus performs the first preset action again after detecting that the stylus performs the first preset action (that is, detecting a selection indication from the stylus), the electronic device may determine that the output indication from the stylus has been detected. Referring to c in FIG. 11A, for example, the second preset action is that the stylus touches and holds the touchscreen of the electronic device. When the electronic device detects that the stylus touches and holds the touchscreen of the electronic device, the electronic device determines that the selection indicator from the stylus has been detected.

In an embodiment, an output key is provided on the stylus. When the stylus detects that the user operates the output key, the stylus may send an output indication to the electronic device. For example, the stylus may send an output indication to the electronic device based on the bluetooth module in the stylus, and the electronic device receives the output indication from the stylus based on the bluetooth module in the electronic device. In an embodiment, the output key may be the same as the selection key, so that the stylus can record an operation of the user on the key, facilitating the stylus to determine whether to select the to-be-stored content or to send the to-be-stored content to the electronic device.

In an embodiment, when the electronic device displays a preset screen, the electronic device may perform detection for the output indication from the stylus. When displaying another non-preset screen, the electronic device does not perform detection for the output indication from the stylus, or does not respond when detecting the output indication from the stylus. For example, the preset screen may be an interface in a preset application program, the preset application program may be but is not limited to a memo application and a notepad application in the electronic device, and the another non-preset screen may be a phone application screen. In other words, the electronic device may perform detection for the output indication from the stylus when displaying the preset screen, c in FIG. 11A shows a screen of the memo application. It should be understood that in FIG. 11A, a process of opening the memo application with the stylus is omitted.

S1006: The stylus sends the to-be-stored content to the electronic device.

S1007: The electronic device outputs the to-be-stored content.

Referring to d in FIG. 11A, the electronic device may display the to-be-stored content. For example, the electronic device may display an image including the to-be-stored content. It should be understood that, when the to-be-stored content is an audio file, the electronic device may play the to-be-stored content.

In an embodiment, the to-be-stored content is an image of the to-be-stored content that includes a text and/or an image, and the electronic device may use optical character recognition (optical character recognition, OCR) to recognize the text in the image of the to-be-stored content, and then convert the image of the to-be-stored content into to-be-stored content in a text format, so as to output the to-be-stored content in a text format. Referring to FIG. 11A, the user may extract key content through the stylus and generate a note on the key content separately, so that the user can directly read the key content, improving user experience.

In the method for generating a note provided in this embodiment of this application, after sending the selection indication to the electronic device, the stylus may select the to-be-stored content on the touchscreen of the electronic device, the electronic device sends the to-be-stored content to the stylus, and the stylus may store the to-be-stored content. When the user needs to generate a note including key content, the stylus sends an output indication to the electronic device, and sends the to-be-stored content to the electronic device, and the electronic device may output the to-be-stored content, that is, generate a note including key content. In this embodiment of this application, the user may use the stylus to extract the to-be-stored content including the key content, and the stylus may store the to-be-stored content, so that when the user needs to output the to-be-stored content, the stylus sends the to-be-stored content to the electronic device, enabling the electronic device to output the to-be-stored content, so as to generate a note including the key content. This is convenient for the user to read the key content and improves user experience.

In an embodiment, the stylus may not have a storage function, and the electronic device has a storage function. The user may use the stylus to indicate the electronic device to store and output the to-be-stored content. In this embodiment, S1003 and S1004 may be replaced by: The electronic device stores the to-be-stored content. Correspondingly, S1006 and S1007 may be replaced by: The electronic device outputs the to-be-stored content. In other words, the electronic device and the stylus do not exchange the to-be-stored content, and the electronic device stores the to-be-stored content.

In an embodiment, that the electronic device outputs the to-be-stored content may be: The electronic device itself outputs the to-be-stored content, or the electronic device sends the to-be-stored content to a third-party device, so that the third-party device outputs the to-be-stored content. In a possible scenario of this embodiment, the electronic device may be wirelessly connected to the third-party device, the third-party device may be a predetermined device, and the predetermined device is a device that is preset to output the to-be-stored content.

The following description uses an example in which the electronic device is a tablet and the third-party device is a mobile phone. Because the tablet may store the to-be-stored content, when the tablet receives the output indication from the stylus, the tablet may send the to-be-stored content to the mobile phone, so that the mobile phone outputs the to-be-stored content in a preset application program. Correspondingly, in this scenario. S1003 and S1004 may be replaced by: The electronic device stores the to-be-stored content. Correspondingly, S1006 and S1007 may be replaced by: The electronic device sends the to-be-stored content to the third-party device, so that the third-party device outputs the to-be-stored content.

Figure 11D:
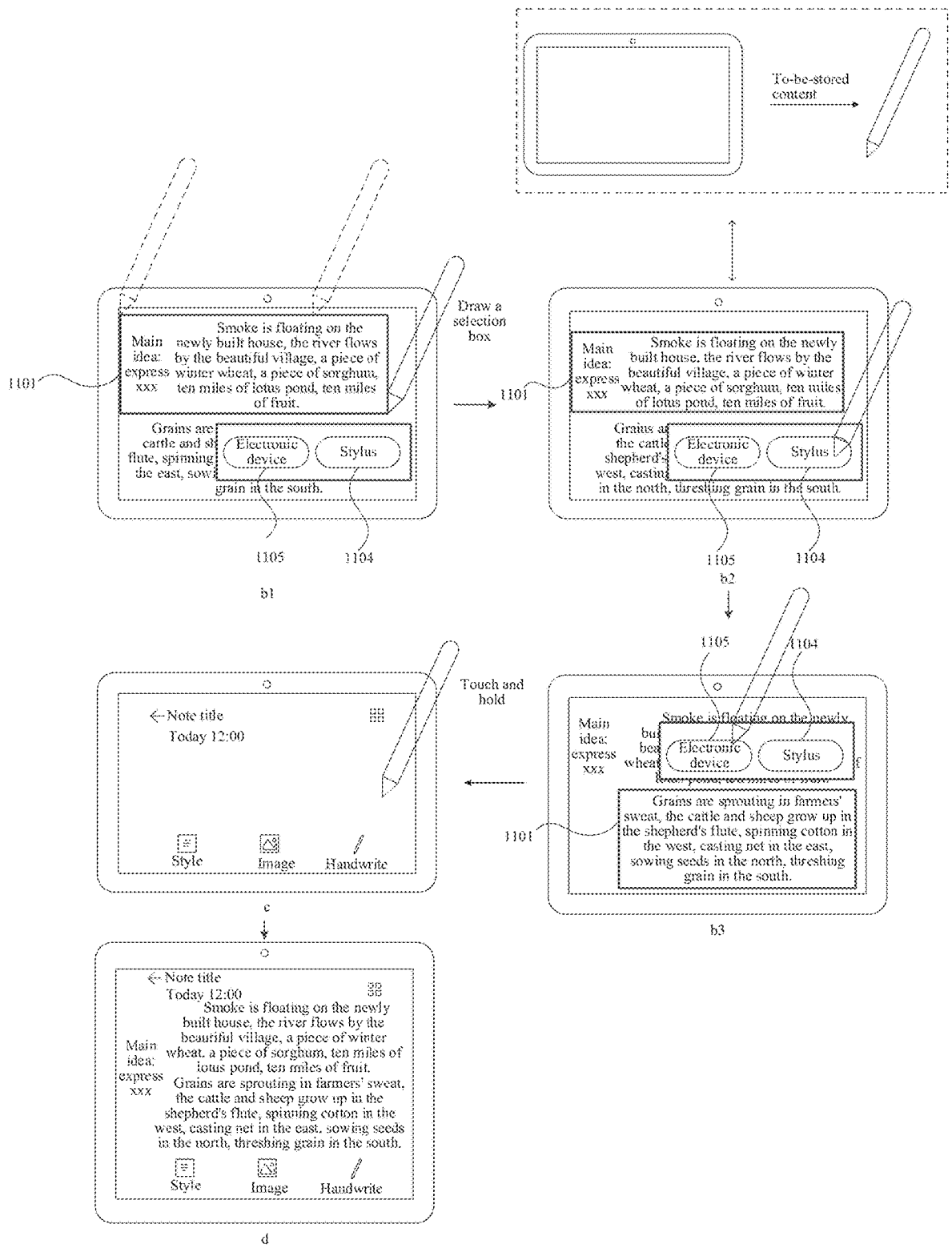
FIG. 11D is another schematic diagram of interaction between an electronic device and a stylus according to an embodiment of this application.

In an embodiment, the stylus has a storage function, and the electronic device also has a storage function. When the user selects the to-be-stored content through the stylus, the user may select a device for storing the to-be-stored content. For example, the device for storing the to-be-stored content may be the stylus and/or the electronic device.

b in FIG. 11A may be replaced by b1 and b2 in FIG. 11D (the user selects the stylus to store the to-be-stored content), or b1 to b3 in FIG. 11D (the user selects the stylus and the electronic device to store the to-be-stored content). Referring to b1 in FIG. 11D, when detecting that the stylus has drawn the selection box 1101, the electronic device may display an identifier of a device that stores the to-be-stored content, for example, displaying an identifier 1104 of "the stylus" and an identifier 1105 of "the electronic device". The user may select the identifier of the device through the stylus, and then indicate the stylus or the electronic device to store the to-be-stored content. For example, referring to b2 in FIG. 11D, the user selects the identifier 1104 of "the stylus" through the stylus, and the electronic device may send the to-be-stored content to the stylus. It should be understood that the user may select the identifier 1104 of "the stylus" and the identifier 1105 of "the electronic device" through the stylus.

It should be understood that, in FIG. 11D, the identifier of "the stylus" and the identifier of "the electronic device" are represented by characters. In other embodiments, the identifier of "the stylus" and the identifier of "the electronic device" may alternatively be represented by using images or other means.

In a possible scenario, referring to b3 in FIG. 11D, after the user selects the stylus to store the to-be-stored content, the user may select the electronic device to store another piece of to-be-stored content. It should be understood that the process of drawing the selection box 1101 with the stylus is omitted in b3 in FIG. 11D, which may be shown with reference to b1 in FIG. 11D. In this scenario, when the stylus sends an output indication to the electronic device, the stylus may send the to-be-stored content to the electronic device. Because another piece of to-be-stored content is also stored in the electronic device, when outputting the to-be-stored content, the electronic device may output the to-be-stored content from the stylus and the another piece of to-be-stored content stored in the electronic device. Referring to c and d in FIG. 11D, for c in FIG. 11D, reference may be made to the relevant descriptions of c in FIG. 11A. A difference from d in FIG. 11A is that the electronic device may output the to-be-stored content from the stylus and the another piece of to-be-stored content stored in the electronic device. In this embodiment of this application, there is no limitation on the format of the to-be-stored content from the stylus output by the electronic device and the another piece of to-be-stored content stored in the electronic device.

It should be understood that, in this embodiment of this application, when the electronic device detects that the stylus selects the to-be-stored content, the identifier 1104 of "the stylus" and the identifier 1105 of "the electronic device" are displayed. FIG. 11D may be combined with the foregoing embodiment, for example, when the stylus selects the store control 1201 or the confirm control 1102, the identifier 1104 of "the stylus" and the identifier 1105 of "the electronic device" are displayed.

It should be noted that the embodiments in this application may be combined with each other, and all the combined embodiments are not exemplified in the embodiments of this application.

Figure 13:
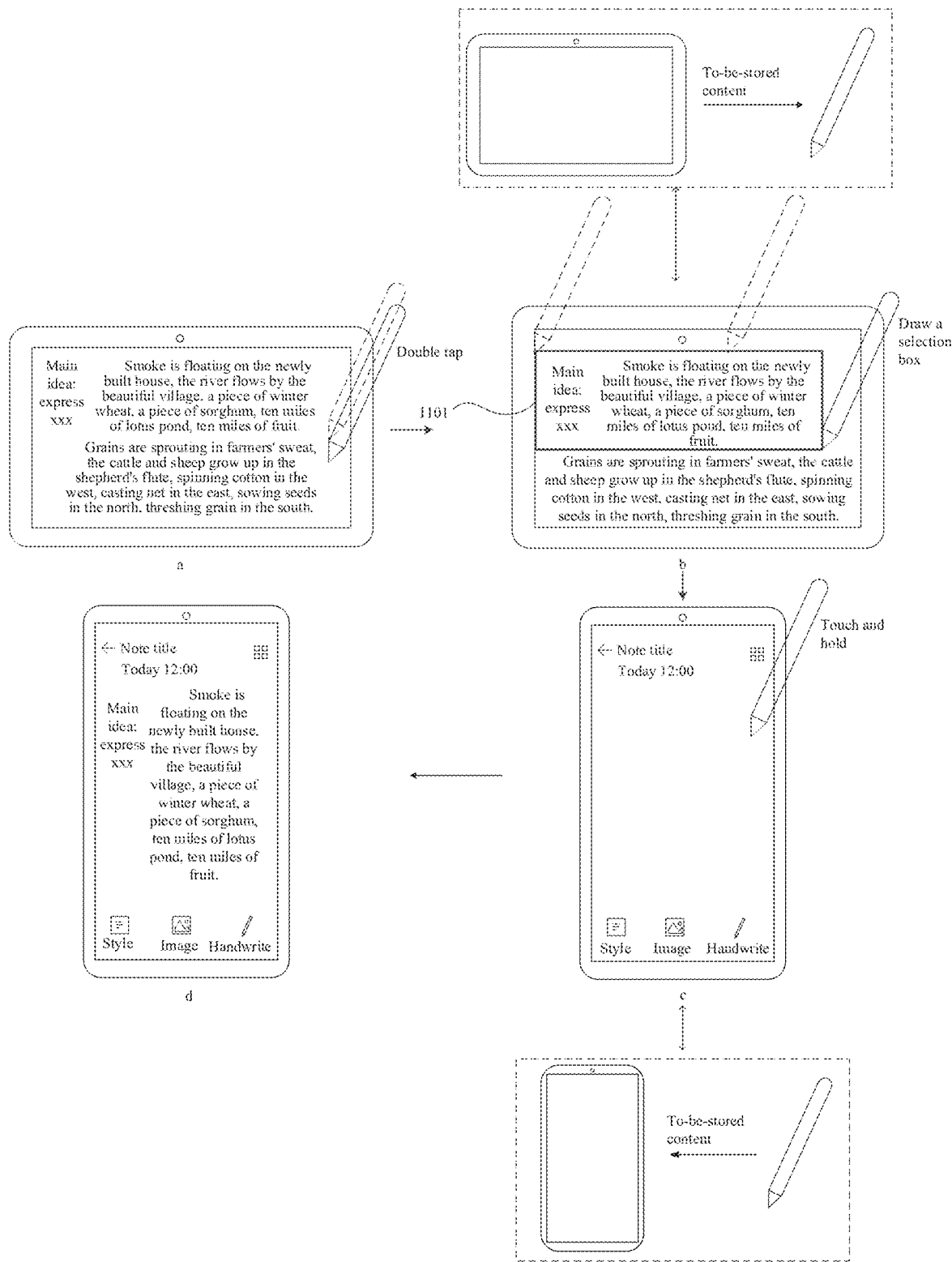
FIG. 13 is another schematic diagram of interaction between an electronic device and a stylus according to an embodiment of this application.

In an embodiment, the stylus may send an output indication to a third-party device (for example, another electronic device), so that the third-party device outputs the to-be-stored content. For example, a tablet is used as an example of the electronic device and a mobile phone is used as an example of the third-party device for description. FIG. 11A may be replaced by FIG. 13. Referring to FIG. 13, after the stylus stores the to-be-stored content, if the touchscreen is touched and held on the screen of the memo application of a mobile phone, the mobile phone may detect an output indication from the stylus, the stylus sends the to-be-stored content to the mobile phone, and the mobile phone may display the to-be-stored content. In this way, the user may store a note across devices based on the storage capability of the stylus, improving user experience.

It should be understood that different electronic devices have different screen sizes, and an electronic device may adjust a format and/or an arrangement of the output to-be-stored content based on a size of its own screen. Referring to FIG. 13, when the mobile phone outputs the to-be-stored content, because a screen size of the mobile phone is different from that of the tablet, the mobile phone may adjust a format and/or an arrangement of the output to-be-stored content to adapt to the screen size of the mobile phone. The embodiments of this application do not specifically limit how the mobile phone adjusts a format and/or an arrangement of the output to-be-stored content to adapt to the screen size of the mobile phone.

In an embodiment, S1005 to S1007 in this embodiment of this application may be replaced by: The stylus sends the to-be-stored content to the third-party device, and the third-party device outputs the to-be-stored content. The third-party device may be another electronic device (for example, a mobile phone), or a cloud server. That is, when receiving the to-be-stored content from the electronic device, the stylus may synchronously send the to-be-stored content to the third-party device, and the third-party device may output the to-be-stored content in real time.

Figure 14:
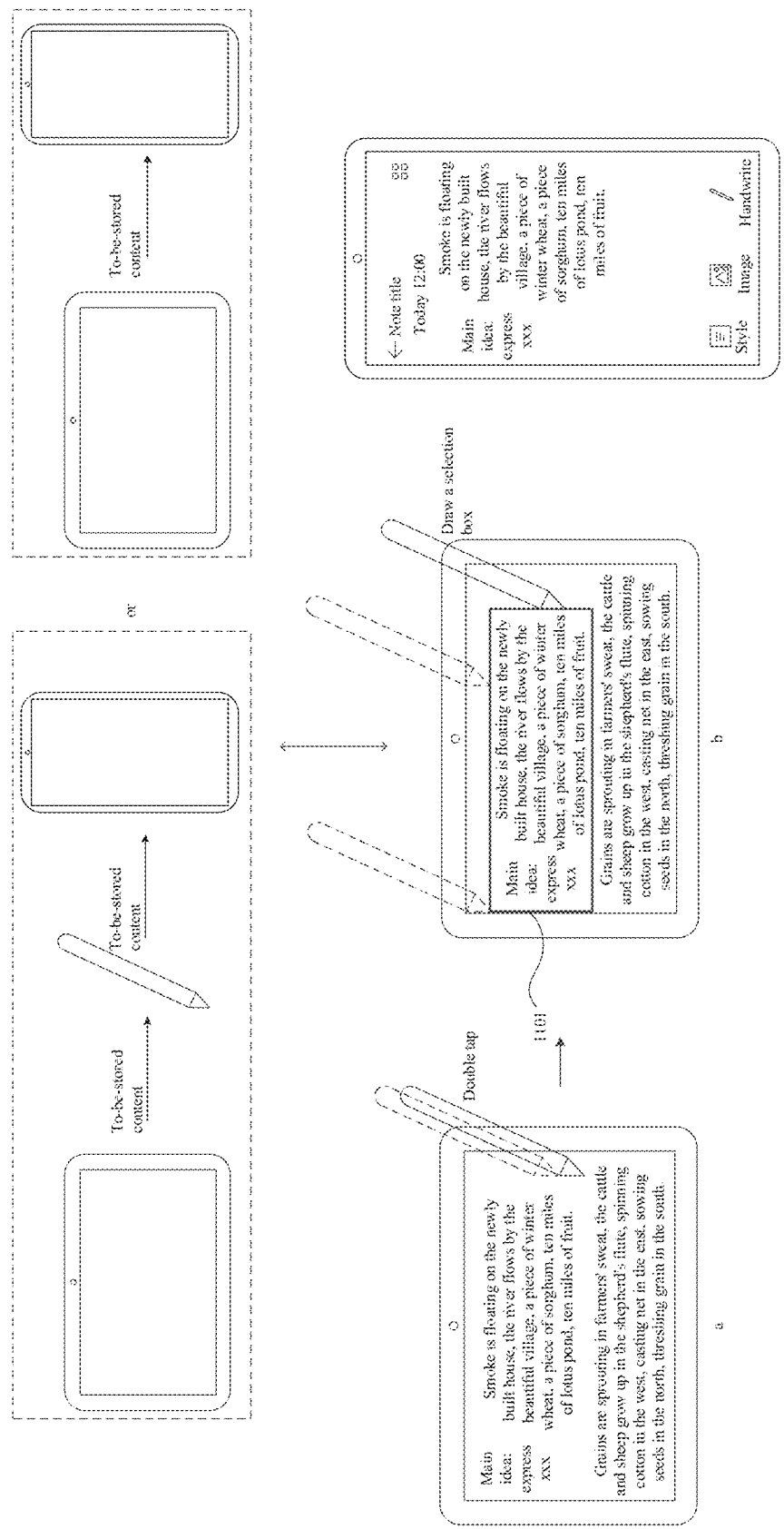
FIG. 14 is another schematic diagram of interaction between an electronic device and a stylus according to an embodiment of this application.

Referring to b in FIG. 14, when the stylus receives the to-be-stored content from the electronic device, the stylus may send the to-be-stored content to the mobile phone (the third-party device), and the mobile phone may synchronously display the content stored in the stylus. In an embodiment, the mobile phone may display the to-be-stored content on the screen of the preset application program. For a in FIG. 14, reference may be made to the relevant descriptions of a in FIG. 11A. Alternatively, in an embodiment, referring to b in FIG. 14, when the tablet detects that the stylus has drawn the selection box, the tablet may send the to-be-stored content to the mobile phone without using the mobile phone, and the mobile phone may display the to-be-stored content synchronously.

In an embodiment, the stylus may implement "immediate storage and output", that is, after the stylus stores one piece of to-be-stored content and outputs the to-be-stored content through an electronic device, the stylus may store a next piece of to-be-stored content. Reference may be made to FIG. 11A. In this embodiment, after sending the to-be-stored content to the stylus, the electronic device may detect whether the output indication has been received from the stylus. When the electronic device does not receive the output indication from the stylus and receives the selection indication from the stylus again, the electronic device may not respond to the selection indication.

In an embodiment, after the electronic device sends the to-be-stored content to the stylus, if the electronic device detects the selection indication from the stylus, the electronic device may continue to send the to-be-stored content to the stylus based on the selection indication, and a plurality of pieces of to-be-stored content may be stored in the stylus. In this embodiment, when the stylus outputs the to-be-stored content through the electronic device, the stylus may output the plurality of pieces of to-be-stored content, or the stylus may output to-be-stored content selected by the user based on selection of the user.

Figure 15:
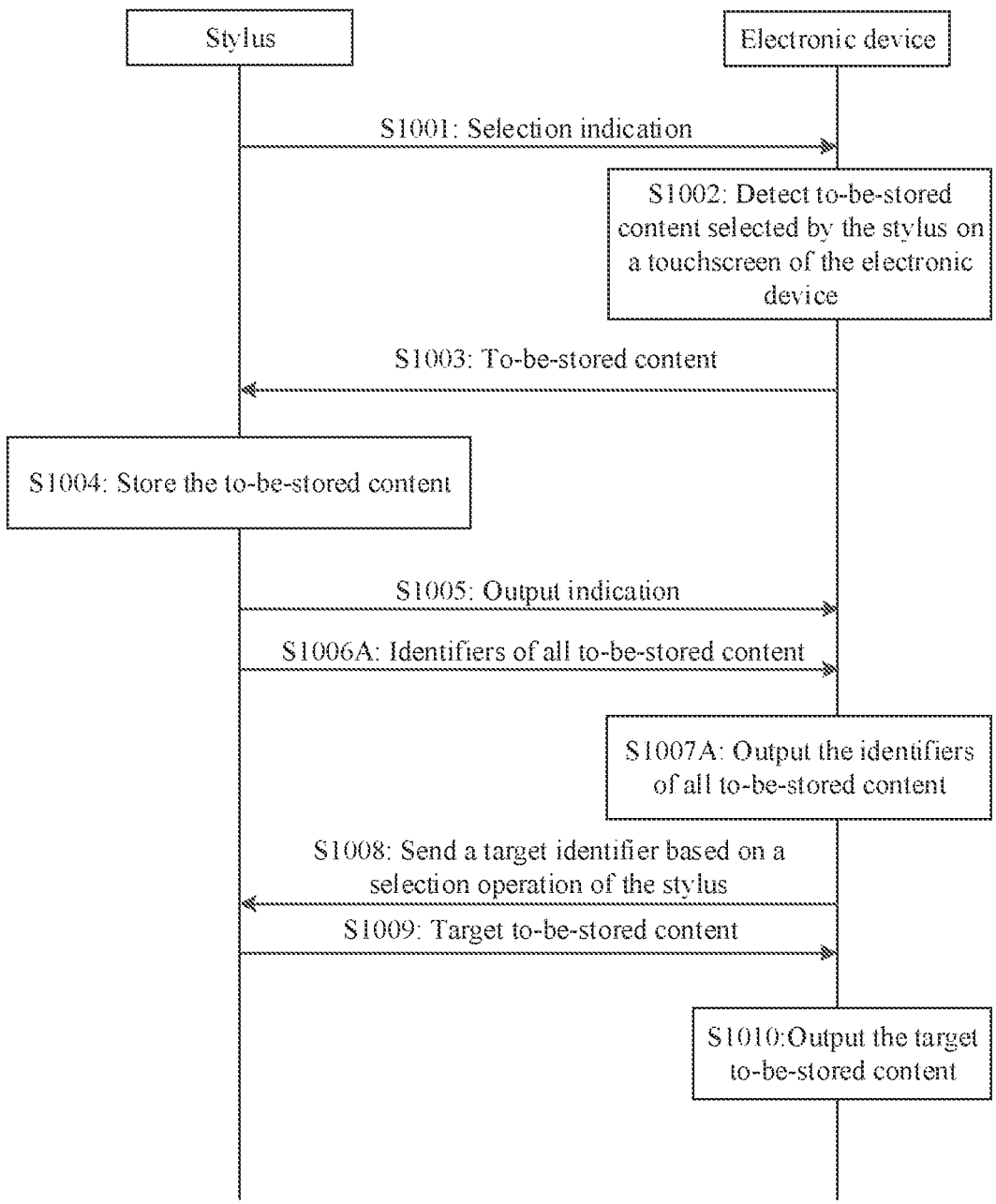
FIG. 15 is a schematic flowchart of another embodiment of a method for generating a note according to an embodiment of this application.

Referring to FIG. 15, S1006 may be replaced by S1006A, and S1007 may be replaced by S1007A and S1008 to S1010.

S1006A: The stylus sends identifiers of all to-be-stored content to the electronic device.

In an embodiment, when sending the to-be-stored content to the stylus, the electronic device may send the identifier of the to-be-stored content to the stylus. The identifier of the to-be-stored content may be a name, a title, a keyword, or the like of the to-be-stored content, which are used to distinguish different to-be-stored content. In this embodiment, when obtaining the to-be-stored content selected by the stylus, the electronic device may obtain the identifier of the to-be-stored content. For example, when the to-be-stored content is a text in a reading page, the electronic device may use a title of the text as the identifier of the to-be-stored content, or the electronic device may extract a keyword from the to-be-stored content, and use the keyword as the identifier of the to-be-stored content. It should be understood that the keyword may be a word with a preset part of speech. For example, the preset part of speech may be a noun. In an embodiment, a quantity of keywords may be a preset quantity.

In an embodiment, after receiving the to-be-stored content from the electronic device, the stylus may obtain the identifier of the to-be-stored content based on the to-be-stored content. For details, refer to the relevant descriptions of obtaining the identifier of the to-be-stored content by the electronic device.

In an embodiment, the stylus may store the to-be-stored content and the identifier of the to-be-stored content in a correspondence manner, so that the stylus may query for the to-be-stored content based on the identifier of the to-be-stored content. In an embodiment, the stylus may store together at least two pieces of to-be-stored content with a same identifier, that is, the stylus may store the same identifier and the at least two pieces of to-be-stored content in a correspondence manner. For example, for an article, if a user obtains at least two pieces of to-be-stored content through the stylus, and identifiers of the at least two pieces of to-be-stored content are both titles of the article, the stylus may store the title of this article and the at least two pieces of to-be-stored content in a correspondence manner.

S1007A: The electronic device outputs the identifiers of all to-be-stored content.

Figure 16:
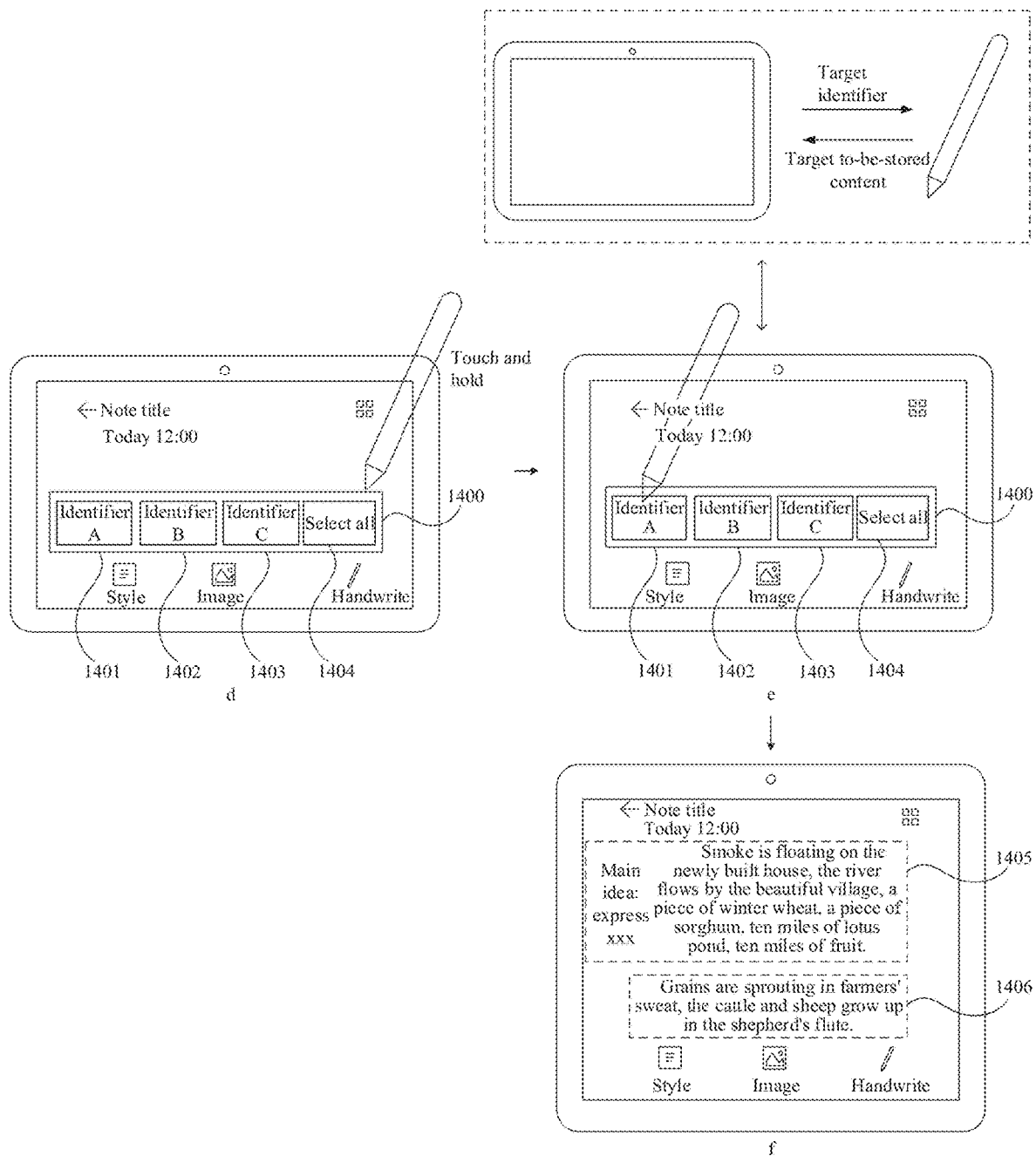
FIG. 16 is another schematic diagram of interaction between an electronic device and a stylus according to an embodiment of this application.

Referring to d in FIG. 16, the electronic device may display an identifier box 1400. The identifier box includes identifiers of all to-be-stored content, such as an identifier A1401, an identifier B1402, and an identifier C1403. In an embodiment, the electronic device may display the identifier box 1400 of each piece of to-be-stored content at a position on which the stylus touches and holds. In an embodiment, a select-all control 1404 may further be displayed in the identifier box 1400. After the stylus operates the select-all control 1404, the stylus selects all identifiers in the identifier box 1400. It should be understood that for a, b, and c in FIG. 16, reference may be made to the relevant descriptions in FIG. 11A. It should be understood that a, b, and c are not shown in FIG. 16, and for interaction between the stylus and the electronic device before d in FIG. 16, reference may be made to a, b, and c in FIG. 12.

S1008: The electronic device sends a target identifier to the stylus based on the selection operation of the stylus.

The user may use the stylus to select an identifier of to-be-stored content that needs to generate a note, based on the identifiers of all to-be-stored content displayed by the electronic device. Correspondingly; the electronic device may detect the selection operation of the stylus for the identifier of the to-be-stored content, and then send the target identifier to the stylus based on the selection operation of the stylus, where the target identifier is the identifier of the to-be-stored content selected by the stylus.

For example, referring to e in FIG. 16, the user selects an identifier A1401 through the stylus, and the electronic device may send the identifier A to the stylus. It is conceivable that if the user selects the "select all" control 1404 through the stylus, the electronic device may send an identifier A, an identifier B, and an identifier C1403 to the stylus.

S1009: The stylus sends the target to-be-stored content to the electronic device, where the target to-be-stored content is to-be-stored content corresponding to the target identifier.

The stylus may obtain the target to-be-stored content based on the target identifier from the electronic device and the identifiers of all to-be-stored content stored in the stylus. The target to-be-stored content is to-be-stored content corresponding to the target identifier. The stylus may send the target to-be-stored content to the electronic device.

S1010: The predetermined device outputs the target to-be-stored content.

For S1010, reference may be made to the relevant descriptions of S1007. Referring to f in FIG. 16, for example, the identifier A is a title of an article, and to-be-stored content 1405 and to-be-stored content 1406 in the article are stored in the stylus, and in this case, the target to-be-stored content includes the to-be-stored content 1405 and the to-be-stored content 1406. When receiving the target to-be-stored content, the electronic device may output the to-be-stored content 1405 and the to-be-stored content 1406.

In this embodiment of this application, the stylus may store a plurality of pieces of to-be-stored content. When the stylus outputs these pieces of to-be-stored content through the electronic device, the stylus may send the identifiers of these pieces of to-be-stored content to the electronic device, so that the electronic device displays the identifiers of the plurality of pieces of to-be-stored content. The user may select a target identifier on the electronic device through the stylus, the electronic device sends the target identifier to the stylus, and the stylus sends to-be-stored content corresponding to the target identifier to the electronic device, thereby enabling the electronic device to output the target to-be-stored content. In the embodiments of this application, the stylus may not perform immediate storage and output, with a wide range of application. In addition, the stylus may classify to-be-stored content with a same identifier based on the identifier of the to-be-stored content, and during note generation, the electronic device may generate a note based on a class of the to-be-stored content, which facilitates convenience for the user to read notes of different classes, improving user experience.

In an embodiment, S1001 to S1003 may be replaced by 1001A, S1004 may be replaced by 1002A, and S1001 to S1003 may be replaced by 1003A.

1001A: An electronic device detects to-be-stored content selected by a stylus on a touchscreen of the electronic device.

1002A: The electronic device controls a target device to store the to-be-stored content, where the target device is the electronic device and/or the stylus.

1003A: The target device outputs the to-be-stored content.

In an embodiment, that the target device is the electronic device and/or the stylus may be predefined, or may be selected and determined by the user through the steps shown in FIG. 11D.

When the target device is an electronic device, the target device outputs the to-be-stored content, which may be: The target device outputs the to-be-stored content in a preset application program, or the target device sends the to-be-stored content to a third-party device, so that the third-party device outputs the to-be-stored content in a preset application program. When the target device is the stylus, the target device outputs the to-be-stored content, which may be: The stylus sends the to-be-stored content to a predetermined device, so that the predetermined device outputs the to-be-stored content in a preset application program. The predetermined device may be the electronic device or the third-party device, and for details, reference may be made to the relevant descriptions in the foregoing embodiments. When the target device is the electronic device and the stylus, the electronic device may output the to-be-stored content stored in the electronic device and the to-be-stored content stored in the stylus, or the third-party device may output the to-be-stored content stored in the electronic device and the to-be-stored content stored in the stylus. In an embodiment, the to-be-stored content stored in the electronic device may be different from the to-be-stored content stored in the stylus.

In this embodiment of this application, the to-be-stored content may be stored by the electronic device and/or the stylus, and the to-be-stored content may be output on a required application or device (the electronic device or the third-party device). The user may read key to-be-stored content, improving user experience.

An embodiment of this application further provides a stylus as shown in FIG. 10A. A processor in the stylus may read a program stored in a memory, to execute the actions performed by the stylus in the foregoing method for generating a note.

An embodiment of this application further provides an electronic device as shown in FIG. 7. A processor in the electronic device may read a program stored in a memory to execute the actions performed by the electronic device in the foregoing method for generating a note. It should be understood that the memory is not shown in FIG. 7.

An embodiment of this application further provides a predetermined device (or a third-party device) with the same structure as the electronic device shown in FIG. 7. A processor in the predetermined device may read a program stored in a memory, to execute the actions performed by the electronic device in the foregoing method for generating a note.

An embodiment of this application further provides a system including the stylus shown in FIG. 10A and the electronic device shown in FIG. 7, and the system can implement the method for generating a note in the foregoing embodiments. Alternatively, an embodiment of this application further provides a system including the stylus shown in FIG. 10A, the electronic device shown in FIG. 7, and a predetermined device, and the system can implement the method for generating a note in the foregoing embodiments.

Unless otherwise specified, "a plurality of" in this specification indicates two or more than two. The term "and/or" in this specification is only an associative relationship for describing associated objects, indicating that three relationships may exist. For example, A and/or B may indicate three scenarios: A alone; A and B; and B alone. In addition, the character "/" in this specification generally represents an "or" relationship between the associated objects. In a formula, the character "/" represents a "divide" relationship between the associated objects.

It should be understood that numbers in the embodiments of this application are merely for differentiation for ease of description, and are not intended to limit the scope of the embodiments of this application.

It should be understood that, in the embodiments of this application, sequence numbers of the foregoing processes do not mean execution sequences. The execution sequences of the processes should be determined according to functions and internal logic of the processes, and should not be construed as any limitation on the implementation processes of the embodiments of this application.

What is claimed is:

1. A method for generating a note, comprising:
   detecting, by an electronic device, a plurality of discontinuous underlines drawn by a stylus on a touchscreen of the electronic device;
   combining, by the electronic device, a content selected by the plurality of discontinuous underlines to obtain a to-be-stored content;
   displaying, by the electronic device, a preview box comprising the to-be-stored content, wherein the preview box is displayed concurrently with, and in addition to, content from which the to-be-stored content is selected;
   controlling, by the electronic device, a target device to store the to-be-stored content and an identifier of the to-be-stored content in a corresponding manner, wherein the target device is at least one of the electronic device and the stylus;
   sending, by the target device, the to-be-stored content to a predetermined device; and
   outputting, by the predetermined device, the to-be-stored content,
   wherein multiple pieces of to-be-stored content are present, and before sending to-be-stored content to the predetermined device, the method further comprises:
   sending, by the target device, identifiers of all to-be-stored content to the predetermined device;
   outputting, by the predetermined device, the identifiers of all to-be-stored content; and
   sending, by the predetermined device, a target identifier in the identifiers of all to-be-stored content to the target device in response to an operation performed by the stylus on the target identifier,
   wherein sending, by the target device, the to-be-stored content to the predetermined device comprises sending target to-be-stored content corresponding to the target identifier to the predetermined device, and
   wherein outputting, by the predetermined device, the to-be-stored content comprises outputting the target to-be-stored content.

2. The method of claim 1, wherein before the plurality of discontinuous underlines, the method further comprises detecting, by the electronic device, a selection indication from the stylus.

3. The method of claim 2, wherein a selection key is provided on the stylus, and detecting the selection indication from the stylus comprises sending, by the stylus, the selection indication to the electronic device in response to detecting an operation of a user on the selection key.

4. The method of claim 2, wherein the selection indication from the stylus is detected in response to detecting that the stylus performs a first preset action on the touchscreen.

5. The method of claim 4, wherein the selection indication from the stylus is detected in response to detecting that the stylus performs the first preset action in a preset area of the touchscreen.

6. The method of claim 4, wherein the first preset action is at least one of the following: double tap, touch and hold, or write a preset track.

7. The method of claim 1, wherein the target device is the stylus, and wherein controlling the target device to store the to-be-stored content comprises:
   sending, by the electronic device, the to-be-stored content to the stylus; and
   storing, by the stylus, the to-be-stored content.

8. The method of claim 1, wherein the predetermined device is a third-party device when the target device is the electronic device, and wherein the predetermined device is the electronic device or the third-party device when the target device is the stylus.

9. The method of claim 1, wherein outputting, by the predetermined device, the to-be-stored content comprises outputting, by the predetermined device, the to-be-stored content in a preset application program.

10. The method of claim 1, wherein the target device is the electronic device, and wherein before sending the to-be-stored content to the predetermined device, the method further comprises detecting, by the electronic device, an output indication from the stylus.

11. The method of claim 1, wherein the target device is the stylus, and wherein before sending the to-be-stored content to the predetermined device, the method further comprises detecting, by the predetermined device, an output indication from the stylus.

12. The method of claim 1, wherein when detecting to-be-stored content selected by the stylus on the touchscreen of the electronic device, the method further comprises displaying, by the electronic device, an identifier of a device that stores the to-be-stored content, wherein the device comprises at least one of the stylus and the electronic device.

13. The method of claim 12, wherein before controlling the target device to store the to-be-stored content, the target device is identified based on a selection operation performed by the electronic device on the identifier of the device.

14. The method of claim 1, wherein the to-be-stored content comprises a to-be-stored image, and wherein before controlling the target device to store the to-be-stored content, the method further comprises taking, by the electronic device, a screenshot of the to-be-stored content to obtain the to-be-stored image.

15. The method of claim 1, wherein the to-be-stored content is at least one of the following: a text, an image, an audio file, a video file, or a contact.

16. A system for generating a note, the system comprising:
- a stylus; and
- an electronic device comprising a touchscreen, the electronic device configured to:
  - detect a plurality of discontinuous underlines drawn by the stylus on the touchscreen;
  - combine a content selected by the plurality of discontinuous underlines to obtain a to-be-stored content;
  - display a preview box comprising the to-be-stored content on the touchscreen, wherein the preview box is displayed concurrently with, and in addition to, content from which the to-be-stored content is selected; and
  - control a target device to store the to-be-stored content and an identifier of the to-be-stored content in a corresponding manner, wherein the target device is at least one of the electronic device and the stylus,
- wherein the target device is configured to send the to-be-stored content to a predetermined device,
- wherein the predetermined device is configured to output the to-be-stored content,
- wherein multiple pieces of to-be-stored content are present, and before sending to-be-stored content to the predetermined device, the target device is configured to send identifiers of all to-be-stored content to the predetermined device,
- wherein the target device is configured to output the identifiers of all to-be-stored content and send a target identifier in the identifiers of all to-be-stored content to the target device in response to an operation performed by the stylus on the target identifier,
- wherein sending the to-be-stored content to the predetermined device comprises sending target to-be-stored content corresponding to the target identifier to the predetermined device, and
- wherein outputting, by the predetermined device, the to-be-stored content comprises outputting the target to-be-stored content.

17. The system of claim 16, wherein before the electronic device detects the plurality of discontinuous underlines, the electronic device is further configured to detect a selection indication from the stylus.

18. The system of claim 16, wherein the predetermined device is a third-party device when the target device is the electronic device, and wherein the predetermined device is the electronic device or the third-party device when the target device is the stylus.

19. The system of claim 16, wherein the target device is the electronic device, and wherein the electronic device detects an output indication from the stylus before sending the to-be-stored content to the predetermined device.

20. The system of claim 16, wherein the target device is the stylus, and wherein before sending the to-be-stored content to the predetermined device, the predetermined device detects an output indication from the stylus.

* * * * *